United States Patent
Sarma et al.

(10) Patent No.: US 11,891,339 B2
(45) Date of Patent: Feb. 6, 2024

(54) CORDIERITE-INDIALITE-PSEUDOBROOKITE STRUCTURED CERAMIC BODIES, BATCH COMPOSITION MIXTURES, AND METHODS OF MANUFACTURING CERAMIC BODIES THEREFROM

(71) Applicant: CORNING INCORPORATED, Corning, NY (US)

(72) Inventors: Huthavahana Kuchibhotla Sarma, San Jose, CA (US); Cameron Wayne Tanner, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 514 days.

(21) Appl. No.: 17/271,988

(22) PCT Filed: Aug. 29, 2019

(86) PCT No.: PCT/US2019/048803
§ 371 (c)(1),
(2) Date: Feb. 26, 2021

(87) PCT Pub. No.: WO2020/047249
PCT Pub. Date: Mar. 5, 2020

(65) Prior Publication Data
US 2021/0323872 A1    Oct. 21, 2021

Related U.S. Application Data

(60) Provisional application No. 62/725,591, filed on Aug. 31, 2018.

(51) Int. Cl.
C04B 35/195 (2006.01)
C04B 38/06 (2006.01)
C04B 38/00 (2006.01)

(52) U.S. Cl.
CPC ........ *C04B 35/195* (2013.01); *C04B 38/0012* (2013.01); *C04B 38/068* (2013.01);
(Continued)

(58) Field of Classification Search
CPC .................................................... C04B 35/195
See application file for complete search history.

(56) References Cited

U.S. PATENT DOCUMENTS

| | | | |
|---|---|---|---|
| 4,329,162 A | 5/1982 | Pitcher, Jr. |
| 4,417,908 A | 11/1983 | Pitcher, Jr. |

(Continued)

FOREIGN PATENT DOCUMENTS

| | | |
|---|---|---|
| CN | 1355776 A | 6/2002 |
| CN | 1845885 A | 10/2006 |

(Continued)

OTHER PUBLICATIONS

Atech Innovations GMBH, "Ceramic membranes", Available Online at <https://web.archive.org/web/20130213023014/https://www.atech-innovations.com/produkte/membranen.html>, Feb. 13, 2012, 1 page.

(Continued)

*Primary Examiner* — Karl E Group
(74) *Attorney, Agent, or Firm* — Joseph M. Homa

(57) ABSTRACT

A ceramic body exhibiting % P≥50%, df≤0.36, and a combined weight percentage of crystalline phases containing cordierite and indialite of at least 85 wt %, and up to 10 wt % of a crystalline pseudobrookite structured phase, such as armalcolite. The ceramic body contains, as expressed on an oxide basis, either: 1% wt % to 11% wt % titania and 89% wt % to 99% wt % MgO, $Al_2O_3$, and $SiO_2$ that have relative weight ratios of MgO:$Al_2O_3$:$SiO_2$ within the field defined by 15.6:34.0:50.4, 12.6:34.0:53.4, 13.9:30.7:55.4, and 16.9:30.7:52.4, or 2.5% to 11% titania and 89% wt % to 97.5% wt % MgO, $Al_2O_3$, and $SiO_2$ that have relative weight ratios
(Continued)

of $MgO:Al_2O_3:SiO_2$ within the field defined by 15.6:34.0: 50.4, 12.6:34.0:53.4, 12.0:35.7:52.3, and 15.0:35.7:49.3. Batch composition mixtures and methods of manufacturing ceramic bodies using the batch compositions are provided, as are other aspects.

20 Claims, 4 Drawing Sheets

(52) U.S. Cl.
CPC .............. C04B 2235/3232 (2013.01); C04B 2235/3481 (2013.01); C04B 2235/9607 (2013.01)

(56) References Cited

U.S. PATENT DOCUMENTS

| | | |
|---|---|---|
| 4,557,773 A | 12/1985 | Bonzo |
| 5,183,608 A | 2/1993 | Guile |
| 5,258,150 A | 11/1993 | Merkel et al. |
| 6,200,483 B1 | 3/2001 | Cutler et al. |
| 6,259,078 B1 | 7/2001 | Araya |
| 6,300,263 B1 | 10/2001 | Merkel |
| 6,391,813 B1 | 5/2002 | Merkel |
| 6,432,856 B1 | 8/2002 | Beall et al. |
| 6,576,579 B2 | 6/2003 | Merkel |
| 6,673,300 B2 | 1/2004 | Allen et al. |
| 6,696,132 B2 | 2/2004 | Beall et al. |
| 6,726,977 B2 | 4/2004 | Kumazawa et al. |
| 6,818,580 B2 | 11/2004 | Kumazawa et al. |
| 6,843,822 B2 | 1/2005 | Beall et al. |
| 6,849,181 B2 | 2/2005 | Ogunwumi et al. |
| 7,246,184 B2 | 7/2007 | Griessbaum |
| 7,294,164 B2 | 11/2007 | Merkel |
| 7,341,970 B2 | 3/2008 | Beall et al. |
| 7,485,170 B2 | 2/2009 | Beall et al. |
| 7,541,303 B2 | 6/2009 | Addiego et al. |
| 7,575,618 B2 | 8/2009 | Miao et al. |
| 7,596,885 B2 | 10/2009 | Adrian et al. |
| 7,601,194 B2 | 10/2009 | Beall et al. |
| 7,618,699 B2 | 11/2009 | Beall et al. |
| 7,648,548 B2 | 1/2010 | Miao et al. |
| 7,648,550 B2 | 1/2010 | Beall et al. |
| 7,704,296 B2 | 4/2010 | Merkel |
| 7,704,442 B2 | 4/2010 | Noguchi et al. |
| 7,744,669 B2 | 6/2010 | Paisley et al. |
| 7,744,670 B2 | 6/2010 | Miao et al. |
| 7,887,897 B2 | 2/2011 | Lu et al. |
| 7,922,951 B2 | 4/2011 | Mudd et al. |
| 7,923,093 B2 | 4/2011 | Melscoet-Chauvel et al. |
| 7,927,682 B2 | 4/2011 | Beall et al. |
| 7,960,009 B2 | 6/2011 | Backhaus-Ricoult et al. |
| 7,981,188 B2 | 7/2011 | Miao et al. |
| 8,007,557 B2 | 8/2011 | Merkel |
| 8,058,198 B2 | 11/2011 | Yamazaki et al. |
| 8,187,525 B2 | 5/2012 | Custer et al. |
| 8,236,083 B2 | 8/2012 | Garcia et al. |
| 8,283,282 B2 | 10/2012 | Noguchi et al. |
| 8,298,311 B2 | 10/2012 | Chen et al. |
| 8,389,101 B2 | 3/2013 | Merkel |
| 8,394,167 B2 | 3/2013 | Merkel et al. |
| 8,407,915 B2 | 4/2013 | George et al. |
| 8,501,296 B2 | 8/2013 | Merkel |
| 8,512,433 B2 | 8/2013 | Beall et al. |
| 8,530,029 B2 | 9/2013 | Lu et al. |
| 8,591,800 B2 | 11/2013 | Noguchi et al. |
| 8,609,032 B2 | 12/2013 | Boger et al. |
| 8,623,287 B2 | 1/2014 | Ramberg et al. |
| 8,673,064 B2 | 3/2014 | Ahmed et al. |
| 8,673,207 B1 | 3/2014 | Boger et al. |
| 8,709,577 B2 | 4/2014 | Beall et al. |
| 8,758,275 B2 | 6/2014 | Kourogi et al. |
| 8,821,803 B2 | 9/2014 | Ramberg et al. |
| 8,844,752 B2 | 9/2014 | Sirota et al. |
| 9,038,284 B2 | 5/2015 | Feldman et al. |
| 9,085,089 B2 | 7/2015 | Noni et al. |
| 9,272,956 B2 | 3/2016 | Backhaus-Ricoult et al. |
| 9,314,727 B2 | 4/2016 | Lu et al. |
| 9,334,191 B2 | 5/2016 | Miao et al. |
| 9,335,093 B2 | 5/2016 | Feldman et al. |
| 9,416,056 B2 | 8/2016 | Zimmermann |
| 9,440,373 B2 | 9/2016 | Feldman et al. |
| 9,757,675 B2 | 9/2017 | He et al. |
| 9,868,670 B2 | 1/2018 | Backhaus-Ricoult et al. |
| 2006/0064957 A1 | 3/2006 | Ogunwumi et al. |
| 2007/0119134 A1 | 5/2007 | Beall et al. |
| 2009/0220733 A1 | 9/2009 | Backhaus-Ricoult et al. |
| 2014/0150389 A1 | 6/2014 | Divens-Dutcher et al. |
| 2016/0347665 A1 | 12/2016 | Divens-Dutcher et al. |
| 2022/0009843 A1* | 1/2022 | Kuchibhotla .... B01D 46/24491 |

FOREIGN PATENT DOCUMENTS

| | | |
|---|---|---|
| CN | 101316805 A | 12/2008 |
| CN | 101336215 A | 12/2008 |
| CN | 102015574 A | 4/2011 |
| CN | 104995154 A | 10/2015 |
| CN | 105848753 A | 8/2016 |
| CN | 105939982 A | 9/2016 |
| CN | 106810293 A | 6/2017 |
| EP | 1666436 A1 | 6/2006 |
| EP | 2065346 A1 | 6/2009 |
| WO | 2010/001968 A1 | 1/2010 |
| WO | 2014/028207 A1 | 2/2014 |
| WO | 2015/042499 A2 | 3/2015 |

OTHER PUBLICATIONS

Barry et al., "Cordierite glass-ceramics-effect of TiO2 and ZrO2 content on phase sequence during heat treatment", Journal of Materials Science, vol. 13, Mar. 1978, pp. 594-610.

Camerucci et al., "Sintering of cordierite based materials", Ceramics International, vol. 29, Issue 2, 2003, pp. 159-168.

Camerucci et al., "Wetting and penetration of cordierite and mullite materials by non-stoichiometric cordierite liquids", Ceramics International, vol. 34, Issue 7, Sep. 2008, pp. 1753-1762.

Chinese Patent Application No. 201980071077.9, Office Action, dated Apr. 24, 2022, 19 pages (10 pages of English Translation and 9 pages of Original Document), Chinese Patent Office.

Hasselman et al., Analysis of Thermal Stress Resistance of Microcracked Brittle Ceramics, Ceramic Bulletin, 58:856-860 (1979).

He et al., "Passenger car fuel-efficiency, 2020-2025",-Comparing stringency and technology feasibility of the Chinese and US standards, International Council on Clean Transportation, Aug. 2013, 16 pages.

Heibel et al., "Advanced Diesel Particulate Filter Design for Lifetime Pressure Drop Solution in Light Duty Applications", SAE Technical Paper, 2007-01-0042, 2007, 12 pages.

Ichikawa et al., "Material Development of High Porous SiC for Catalyzed Diesel Particulate Filters, SAE Technical Paper, 2003-01-0380", Technical Paper, Mar. 3, 2003, 8 pages.

Jørgensen et al., "Optimization of protein fractionation by skim milk microfiltration: Choice of ceramic membrane pore size and filtration temperature", J. Dairy Science, vol. 99, No. 6, 2016, pp. 164-6179.

Latella et al., "Permeability and high temperature strength of porous mullite-alumina ceramics for hot gas filtration", J. Mater. Sci., 41:423-30 (2006).

Maricq, How are emissions of nuclei mode particles affected by new PM control technologies and fuels?, Ford Motor Company, Health Effects Institute Annual Conference, 2009, 16 pages.

Merkel et al., "New cordierite diesel particulate filters for catalyzed and non-catalyzed applications", in Proc. 6th Int. Congress on Catalysis and Automotive Pollution Control, Aug. 2003, 9 pages.

Naseri et al., Development of SCR on Diesel Particulate Filter System for Heavy Duty Applications, SAE International Journal of Engines, 4(1):1798-1809 (2011).

Ogyu et al., Development of High Porosity SiC-DPF Which is Compatible with High Robustness and Catalyst Coating Capability for SCR Coated DPF Application, SAE Technical Paper 2013-01-0840, Apr. 8, 2013.

(56) References Cited

OTHER PUBLICATIONS

Ohara et al., Filtration Behavior of Diesel Particulate Filters (1), SAE Technical Paper, 1007-01-0921, Apr. 16, 2007.

Pall, Corporation, 25 Harbor Park Drive, Port Washington, NY, https://shop.pall.com/us/en/chemicals-polymer/chemicals/chemicals-raw-material-/-gas/air/aerolith-ceramic-products-zidgri781w6, 5 pages.

pall.com, "Membralox® Ceramic Membrane Products", Available Online at <https://web.archive.org/web/20200812010012/https://shop.pall.com/us/en/food-beverage/dairy/whole-milk-concentration/membralox-ceramic-membrane-products-zidgri78lwl>, Retrieved on Aug. 12, 2020, 5 pages.

Schreyer et al., "Compositions and Structural States of Anhydrous Mg-Cordierites: A Re-investigation of the Central Part of the System MgO—Al2O3—SiO2", J. Petrol., vol. 2, 1961, pp. 324-406.

Selvaraj et al., "Seeding effects on crystallization of cordierite glass powder", vol. 26, 1991, pp. 3689-3692.

Seong et al., "Particulate Emissions Control by Advanced Filtration Systems for GDI Engines" (ANL/Corning/Hyundai CRADA, Dept. of Energy Project Id: ACE024, 2013, 28 slides.

Standard Test Method for Dynamic Young's Modulus, Shear Modulus, and Poisson's Ratio for Advanced Ceramics by Sonic Resonance, ASTM 1198-20, reapproved 2013.

Webb et al., "Strength Size Effects in Cellular Ceramic Structures", Ceramic Engineering and Science Proceedings—Mechanical Properties and Performance of Engineering Ceramics II, vol. 27, No. 2, 2006, pp. 521-531.

Zdaniewski, W., "Crystallization and structure of a MgO—Al2O3—SiO2—TiO2 glass-ceramic", J. Mat. Sci., vol. 8, 1973, pp. 192-202.

Gökçe et al., "Microstructural and Physical Characterization of Aluminium Titanate/ Cordierite Ceramics", Apr. 2005, 6 pages.

International Search Report and Written Opinion of the International Searching Authority; PCT/US2019/048803; dated Dec. 3, 2019, 12 pages; European Patent Office.

\* cited by examiner

"Enlarged View"

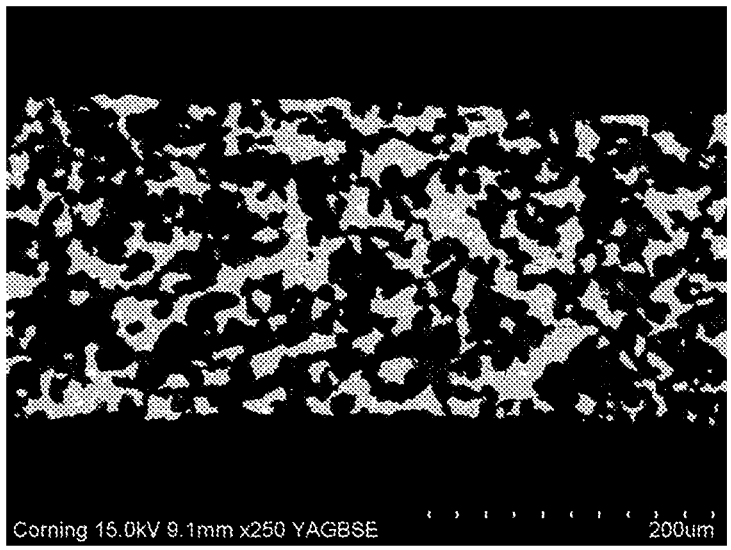
FIG. 4A  E9
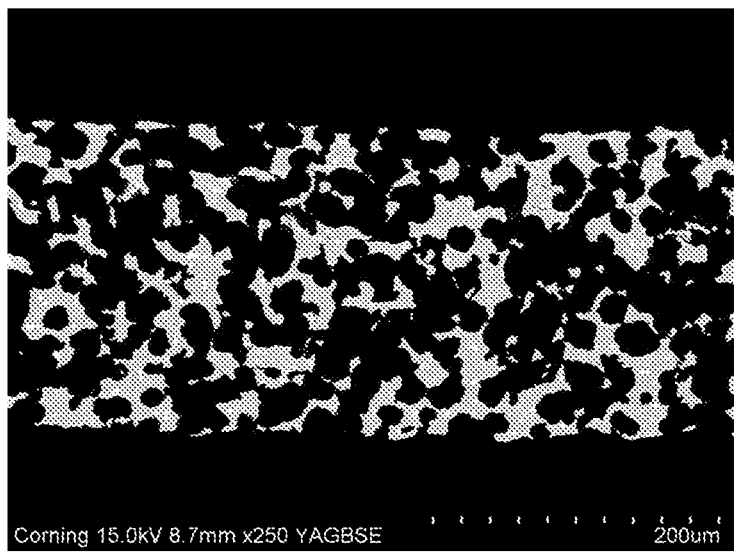
FIG. 4B  E7C
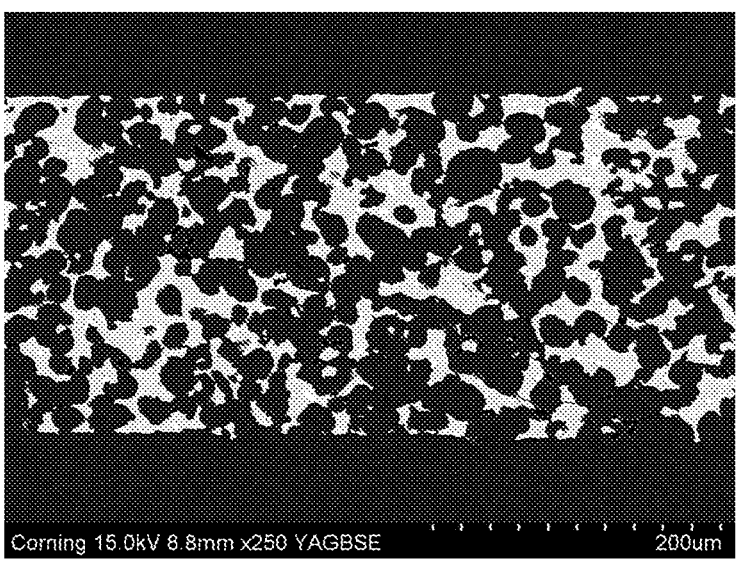
FIG. 4C  E18

CORDIERITE-INDIALITE-PSEUDOBROOKITE STRUCTURED CERAMIC BODIES, BATCH COMPOSITION MIXTURES, AND METHODS OF MANUFACTURING CERAMIC BODIES THEREFROM

This is a national stage application under 35 U.S.C. § 371 of International Application No. PCT/US2019/048803, filed Aug. 29, 2019, which claims the benefit of priority under 35 U.S.C. § 119 of U.S. Provisional Patent Application No. 62/725,591, filed on Aug. 31, 2018, the content of which is incorporated herein by reference in its entirety.

FIELD

Example embodiments of the present disclosure relate to cordierite and pseudobrookite structured ceramic bodies and more particularly to porous cordierite and pseudobrookite structured honeycomb bodies useful in engine exhaust aftertreatment and other filtration applications.

BACKGROUND

Cordierite-based honeycombs and aluminum titanate-based honeycombs have been widely used for a variety of exhaust mitigation/treatment applications, such as in catalytic converters and in particulate filters for diesel and gasoline engine emissions control.

Diesel particulate filters (DPF) and gasoline particulate filters (SPF) can be produced from a porous ceramic honeycomb body by plugging some channels in a pattern to form a plugged honeycomb body.

Exhaust gas flows through porous walls of a plugged ceramic honeycomb body. Along its flow path through the porous walls, particulates from the exhaust gas can be deposited in the pores, on the porous wall surface, or on a soot layer deposited or formed on the porous wall surface, thus providing filtering of particulates from the exhaust gas. The forming soot layer can be periodically burned in a regeneration cycle so that the DPF/GPF can have a designed lifetime comparable to that of the vehicle.

SUMMARY

Example embodiments of the present disclosure provide ceramic bodies comprising a cordierite-indialite-pseudobrookite crystalline structure.

Example embodiments of the present disclosure also provide a ceramic honeycomb body comprising porous walls containing a cordierite-indialite-pseudobrookite crystalline structure.

Example embodiments of the present disclosure also provide a batch composition mixture useful for the manufacture of a cordierite-indialite-pseudobrookite crystalline structure.

One or more example embodiments of the present disclosure also provide a method for manufacturing a ceramic body comprising a cordierite-indialite-pseudobrookite crystalline structure.

Additional features of the disclosure will be set forth in the description which follows, and in part will be apparent from the description, or may be learned by practice of the embodiments disclosed herein.

In one aspect, embodiments of the disclosure provide a ceramic body comprising % P≥50%, wherein % P is average bulk porosity by volume; df≤0.36, wherein df is $(d_{50}-d_{10})/d_{50}$; a combined weight percentage of crystalline phases containing cordierite and indialite of at least 85 wt % and up to 10 wt % of a crystalline phase comprising a pseudobrookite structure, wherein the ceramic body contains, as expressed in weight percent on an oxide basis, either:

1% wt % to 11% wt % titania and 89% wt % to 99% wt % MgO, $Al_2O_3$, and $SiO_2$ that have relative weight ratios of $MgO:Al_2O_3:SiO_2$ within the field defined by 15.6:34.0:50.4, 12.6:34.0:53.4, 13.9:30.7:55.4, and 16.9:30.7:52.4, or 2.5% to 11% titania and 89% wt % to 97.5% wt % MgO, $Al_2O_3$, and $SiO_2$ that have relative weight ratios of $MgO:Al_2O_3:SiO_2$ within the field defined by 15.6:34.0:50.4, 12.6:34.0:53.4, 12.0:35.7:52.3, and 15.0:35.7:49.3.

Another example embodiment discloses a ceramic body comprising crystalline phases comprising cordierite and indialite with a combined weight percentage ranging between 85 wt % to 92 wt %, and a second crystalline phase of up to 10 wt % of a pseudobrookite structure comprising armalcolite, wherein the ceramic body contains, as expressed in weight percent on an oxide basis, 1% wt % to 11% wt % titania, and 89% wt % to 99% wt % MgO, $Al_2O_3$, and $SiO_2$ that have relative weight ratios of $MgO:Al_2O_3:SiO_2$ within the field defined by 15.6:34.0:50.4, 12.6:34.0:53.4, 13.9:30.7:55.4, and 16.9:30.7:52.4;

55%≤% P≤72%; 8 µm≤$d_{50}$≤20 µm, wherein $d_{50}$ is a median pore size; and 0.16≤df≤0.32, wherein df is $(d_{50}-d_{10})/d_{50}$.

Another example embodiment discloses a ceramic body comprising crystalline phases comprising corciierite and indialite with a combined weight percentage ranging between 85 wt % to 92 wt %, and a second crystalline phase of up to 10 wt % pseudobrookite structure comprising armalcolite, wherein the ceramic body contains, as expressed in weight percent on an oxide basis, 2.5% to 11% titania and 89% wt % to 97.5% wt % MgO, $Al_2O_3$, and $SiO_2$ that have relative weight ratios of $MgO:Al_2O_3:SiO_2$ within the field defined by 15.6:34.0:50.4, 12.6:34.0:53.4, 12.0:35.7:52.3, and 15.0351:49.3;

55%≤% P≤72%;

8 µm≤$d_{50}$≤20 µm, wherein $d_{50}$ is a median pore size; and 0.16≤df≤0.32, wherein df is $(d_{50}-d_{10})/d_{50}$.

In another example embodiment, a batch composition mixture is disclosed. The batch composition mixture comprises a magnesia source, an alumina source, a silica source, and a titania source expressed in weight percent on an oxide basis, of either:

1% wt % to 11% wt % titania and 89% wt % to 99% wt % MgO, $Al_2O_3$, and $SiO_2$ that have relative weight ratios of $MgO:Al_2O_3:SiO_2$ within the field defined by 15.6:34.0:50.4, 12.6:34.0:53.4, 13.9:30.7:55.4, and 16.9:30.7:52.4;

or 2.5% to 11% titanic and 89% wt % to 97.5% wt % MgO, $Al_2O_3$, and $SiO_2$ that have relative weight ratios of $MgO:Al_2O_3:SiO_2$ within the field defined by 15.6:34.0:50.4, 12.6:34.0:53.4, 12.0:35.7:52.3, and 15.0:35.7:49.3.

Yet another example embodiment discloses a method of manufacturing a ceramic body. The method comprises providing inorganic ingredients, comprising:

a magnesia source in a range from 20 wt % to 42 wt %,
an alumina source in a range from 25 wt % to 40 wt %,
a silica source a range from 15 wt % to 30 wt %, and
a titania source a range from 1 wt % to 10 wt %, wherein the wt % of each of the magnesia source, alumina source, silica source, and titanic source are all based on 100% of a total weight of inorganics present;

mixing the inorganic ingredients together with an organic binder, a pore former in a range from 26 wt % SA to 56 wt % SA, and a liquid vehicle to form a batch composition mixture, wherein wt % SA is weight percent by superaddition based on 100% of the total weight of the inorganics;

shaping the batch composition mixture into a green body; and firing the green body under conditions effective to convert the green body into ceramic body comprising a combined weight percentage of at least 85 wt % of crystalline phases containing cordierite and indialite, and up to 10 wt % of a crystalline phase comprising a pseudobrookite structure.

It is to be understood that both the foregoing general description and the following detailed description provide numerous examples and are intended to provide further explanation of the disclosure.

BRIEF DESCRIPTION OF THE DRAWINGS

The accompanying drawings are included to provide a further understanding of the disclosure and are incorporated in and constitute a part of this specification, illustrate exemplary embodiments, and together with the description serve to explain the principles of the disclosure. The drawings are not necessarily drawn to scale, Like reference numerals are used to denote the same or substantially similar parts.

FIGS. 4A-4C illustrate representative micrographs of polished cross-sections of porous walls of example ceramic bodies (e.g., examples E9, E7C, and E20) comprising a cordierite, indialite, and pseudobrookite crystalline structured ceramic according to embodiments of the disclosure.

DETAILED DESCRIPTION

Figure 1A:
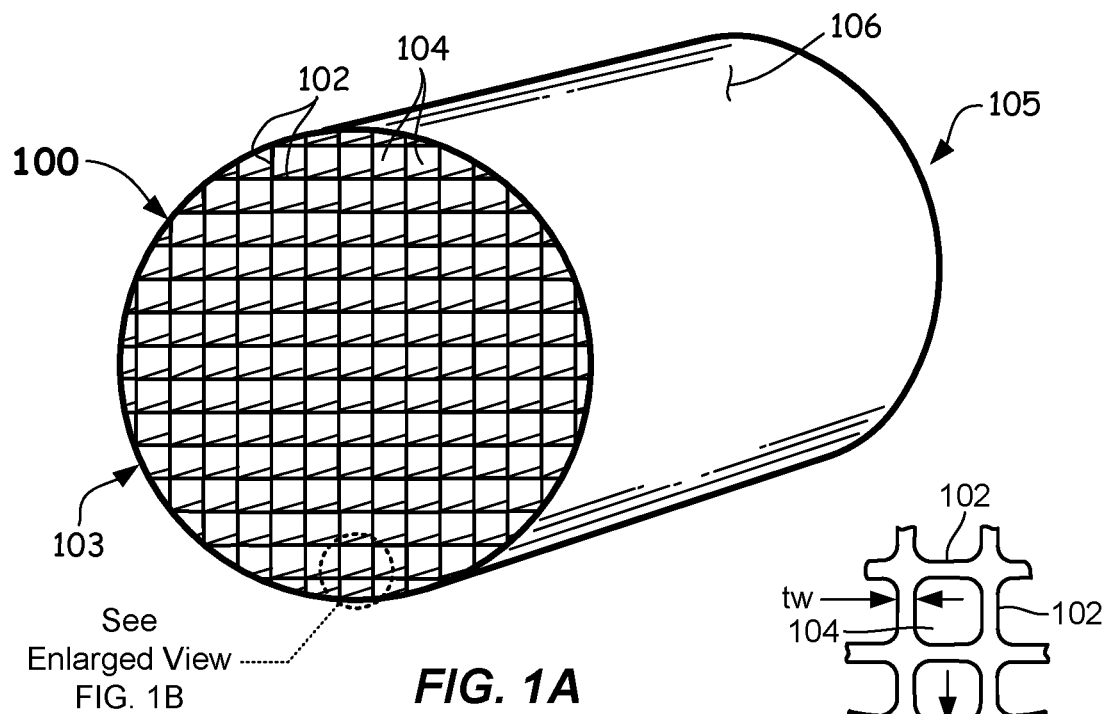
FIG. 1A illustrates a perspective view of a ceramic body embodied as a honeycomb body comprising a cordierite, indialite, and pseudobrookite crystalline structured ceramic according to embodiments of the disclosure.

The disclosure is described more fully hereinafter with reference to the accompanying drawings, in which example embodiments are shown. The disclosure may, however, be embodied in many different forms and should not be construed as limited to the embodiments set forth herein, in the drawings, the size and relative sizes of features and components may be exaggerated for clarity and thus may not be drawn to scale. Like reference numerals in the drawings may denote like elements.

It will be understood that when an element is referred to as being "on," "connected to," or "coupled to" another element, it can be directly on or directly connected to the other element, or intervening or interconnecting elements may be present. In contrast, when an element is referred to as being "directly on" or "directly connected to" another element, there is no intervening element present.

Various de-NOx or diesel oxidation catalysts (DOC) catalysts or even three-way catalysts (TWC) or selective catalyst reduction (SCR) catalysts can be integrated into plugged honeycomb filter bodies. Relatively high catalyzation efficiency can be achieved by utilizing high catalyst loading. Washcoat loadings of 100 are currently common practice, and future loadings may exceed 150 g/l. In various embodiments high catalyst loading with low backpressure can be provided by honeycomb filter bodies made from ceramic honeycomb structures comprising very high porosity and relatively large pore size.

Porous cordierite and aluminum titanate-feldspar composite honeycomb ceramic articles can exhibit low thermal expansion, relatively high porosity, low Young's modulus and high strength for high-performance automotive catalytic converters and diesel particulate filters. For example, as disclosed in U.S. Pat. No. 8,394,167, the content of which is hereby incorporated by reference in its entirety herein, cordierite-mullite-aluminum titanate (CMAT) composite bodies are provided that exhibit improved strength as compared to aluminum titanate-feldspar composites and a better volumetric heat capacity compared to cordierite due to the phase assembly and microstructure of CMAT ceramic materials. The combination of both advantages makes CMAT materials particularly suited for high porosity applications such as in ceramic honeycomb filter bodies, such as for TWC and SCR applications. The pseudobrookite structured phase in these CMAT composites can be stabilized by magnesium in solid solution so that it can be thermodynamically more stable than the aluminum titanate phase encountered in aluminum titanate feldspar (AT) composites and also can better resist thermal decomposition and accelerated decomposition at high temperature when exposed to glass-forming elements, such as copper, manganese, cobalt, bismuth, and the like and their compounds. However, various embodiments herein provide various combinations of high porosity, relatively high median pore size, narrow pore size distribution, and relatively low CTE.

Example ceramic body embodiments disclose a cordierite, indialite, and pseudobrookite structured phase in a composition range that provides unexpected and superior performance over prior art AT, cordierite, and cordierite-mullite-aluminum-titanate (CMAT) materials. In more detail, the disclosure provides a ceramic body, comprising: relatively high average bulk porosity by volume (e.g., % P≥50%), relatively narrow pore size distribution (e.g., df≤0.36, wherein df is $(d_{50}-d_{10})/d50$), relatively high combined weight percentage of crystalline phases containing cordierite and indialite (e.g., at least 85 wt %), and up to 10 wt % of a crystalline pseudobrookite structured phase (e.g., armalcolite).

In particular, the ceramic body contains, as expressed in weight percent on an oxide basis, either:

1% wt % to 11% wt % titania and 89% wt % to 99% wt % MgO, $Al_2O_3$, and $SiO_2$ that has relative weight ratios of $MgO:Al_2O_3:SiO_2$ within the field defined by 15.6:34.0:50.4, 12.6:34.0:53.4, 13.9:30.7:55.4, and 16.9:30.7:52.4, or 2.5% to 11% titania and 89% wt % to 97.5% wt % MgO, $Al_2O_3$, and $SiO_2$ that has relative weight ratios of $MgO:Al_2O_3:SiO_2$ within the field defined by 15.6:34.0:50.4, 12.6:34.0:53.4, 12.0:35.7:52.3, and 15.0:35.7:49.3.

Definitions

Cordierite—A magnesium aluminum cyclosilicate having the series formula: $(Mg,Fe)_2Al_3(Si_5AlO_{18})$ to $(Fe,Mg)_2Al_3(Si_5AlO_{18})$. Iron and nickel may be present in small amounts, i.e., less than 4 wt %. Cordierite crystals can be used to make very low thermal expansion along one axis.

Indialite—A high temperature polymorph aluminosilicate phase that is the hexagonal dimorph of cordierite, which is isostructural with beryl and has a random distribution of Al in the $(Si, Al)_6O_{18}$ rings. It is compositionally similar to cordierite and also has negative thermal expansion along one crystallographic axis. The transformation of indialite into cordierite occurs slowly, and indialite is metastable below about 1250° C. Iron on and nickel may be present in small amounts, i.e., less than 4 wt %.

Spinel—A hard crystalline phase material occurring as octahedral crystals and consisting of magnesium and aluminum oxides.

Enstatite—An orthorhombic material $MgSiO_3$ of the pyroxene group consisting of magnesium silicate.

Rutile—A ceramic material comprised primarily of titanium dioxide ($TiO_2$).

Pseudobrookite Structured Phase—A structured phase being solid solutions of one or more of tialite ($Al_2TiO_5$), pseudobrookite ($Fe_2TiO_5$), armalcolite $(Mg,Fe^{2+})Ti_2O_5$, and/or karooite ($MgTi_2O_5$).

Cristabolite—A high-temperature polymorph of silica, meaning that it has the same chemical formula as quartz ($SiO_2$) but a distinct crystal structure.

Amorphous phase—A glass that contains predominantly silica and lesser amounts of alumina, magnesia, titania and oxide impurities of sodium, calcium, iron, and nickel.

Figure 1B:
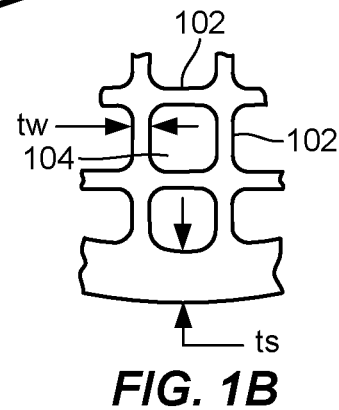
FIG. 1B illustrates an enlarged end view of a portion of the ceramic honeycomb body of FIG. 1A according to embodiments of the disclosure.

Various embodiments of the disclosure will now be described with reference to the Tables and FIGS. 1A-5 disclosed and described herein. In some embodiments, the ceramic body 100 may be embodied as a honeycomb body as shown in FIGS. 1A and 1B. The ceramic body 100 embodied as a honeycomb body can comprise a matrix of intersecting porous walls 102 forming a honeycomb of channels 104 that extend along an axial length of the ceramic body 100 from a first end 103 (e.g., an inlet end) to a second end 105 (e.g., an outlet end). The channels 104 can be co-parallel with one another. The channel shape in transverse cross-section, as outlined by the walls 102 can be square as shown in FIGS. 1A and 1B. However, alternatively, the transverse cross-section channel shape can be rectangular (non-square), triangular, octagonal, hexagonal, diamond, circular, other polygonal, combinations of the aforementioned, and the like, and may have rounded corners, chamfered corners, square corners, or combinations thereof.

The ceramic body 100 when configured as a honeycomb body can comprise a configuration having a transverse wall thickness tw of the walls 102 ranging from 0.002 inch to 0.016 inch (0.05 mm to 0.41 mm—see FIG. 1B), or even 0.004 to 0.012 inch (0.10 mm to 0.30 mm) in some embodiments. Further, the intersecting porous walls 102 may be of a substantially constant thickness across the honeycomb body or may be of various thicknesses. For example, the wall thickness tw of the intersecting porous walls 102 can be greater near the skin 106 of the ceramic body 100, to provide a nab of thicker walls near the skin 106.

Figure 1C:
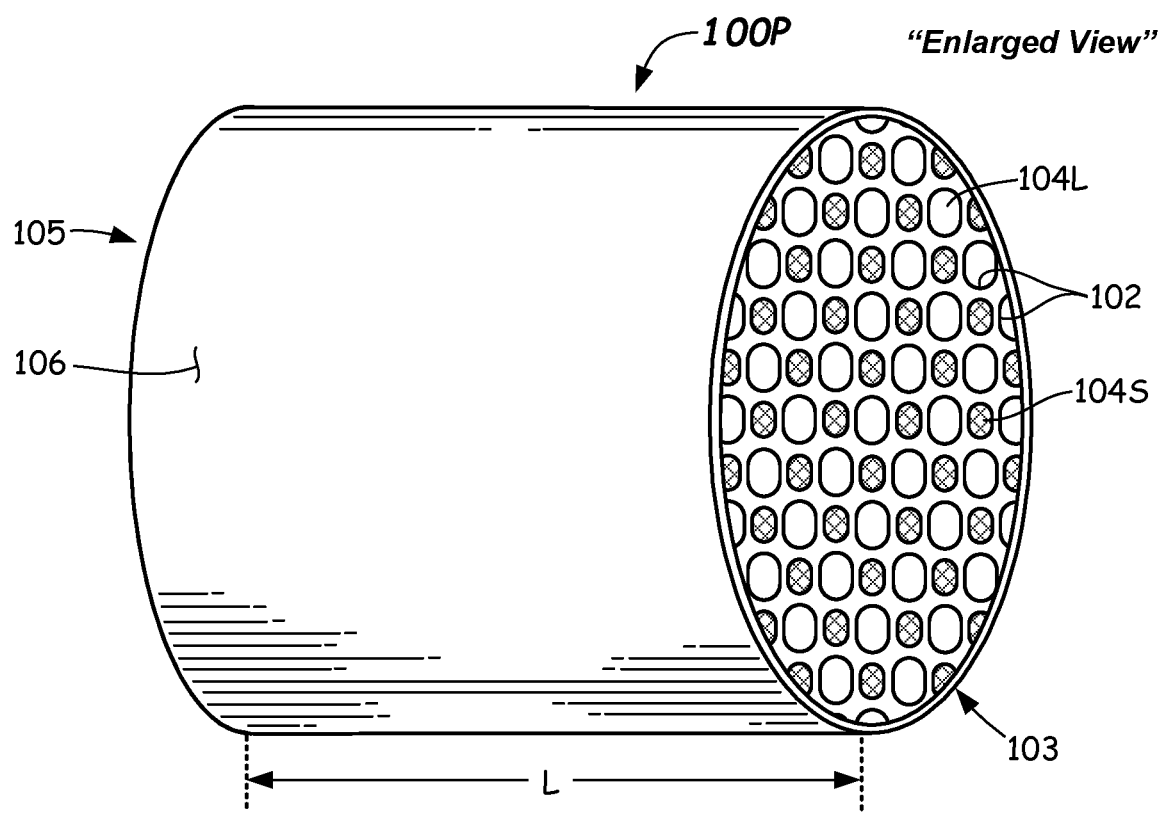
FIG. 1C illustrates a perspective view of a ceramic body embodied as a plugged honeycomb body comprising a cordierite, indialite, and pseudobrookite crystalline structured ceramic according to embodiments of the disclosure.

The ceramic body 100, when configured as a honeycomb body of FIG. 1A or plugged honeycomb body of FIG. 1C, can have average cell densities ranging from an average cell density of 15.5 cells/cm² to 77.5 cells/cm² (100 cpsi to 500 cpsi), for example. Other cell densities can be used. Example geometries of the ceramic body 100 may have an average cell density of 400 cpsi (62 cells/cm²) with a transverse wall thickness of about 8 mils (0.20 mm) defined herein as a 400/8 honeycomb body, or an average cell density of 400 cpsi (62 cells/cm²) and a wall thickness of about 6 mils (0.15 mm) and defined as a 400/6 honeycomb body. Other geometries of the ceramic body 100 can include, for example, combinations of average cell density/transverse wall thickness of 100/17, 200/12, 200/19, 270/19, 300/8, 200/8, and 350/12. Other suitable combinations of cell density and transverse wall thickness can be used.

In some honeycomb bodies, when the ceramic body 100 is embodied as a plugged ceramic honeycomb body 100P, certain ones of the channels 104 can be plugged. For example, as shown in FIG. 1C, a plugged ceramic honeycomb body 100P is shown that can be included in a particulate filter for diesel engine or gasoline engine applications. In the depicted embodiment of FIG. 1C, some of the channels 104L can have a larger hydraulic area than of the other smaller channels 104S, such as described in, for example, U.S. Pat. Nos. 6,843,822; 6,696,132; 7,247,184; and 7,601,194. In other embodiments, the plugged ceramic honeycomb body 100P can include the same-sized inlet and outlet channels, such as disclosed in U.S. Pat. Nos. 4,329, 162; 6,849,181; 8,512,433; and 8,236,083, for example. Other filter plugging patterns are possible as disclosed in U.S. Pat. Nos. 9,757,675; 8,673,064; 4,417,908, and 8,844, 752, for example.

The outermost cross-sectional shape of the ceramic body 100 (and the plugged honeycomb body 100P) may be of any desired outer cross-sectional shape, such as a circle (as shown in FIGS. 1A and 1C), an ellipse, an oval, a triangular or tri-lobed shape, a racetrack, a square, or a rectangular cross-sectional outer shape. However, the honeycomb body 100 and plugged honeycomb body is not limited to these cross-sectional shapes. Other cross-sectional shapes may be used. Ceramic body 100 as used herein includes, but is not limited to, honeycomb bodies as well as plugged honeycomb bodies 100P.

Example embodiments of the ceramic bodies 100 of the present disclosure can comprise a relatively high level of total bulk porosity that is open and interconnected porosity. For example, ceramic bodies 100 of the composition described herein can comprise an average bulk porosity, % P, wherein % P≥50%, % P≥55%, % P≥60%, or even % P≥65%, as determined by mercury intrusion porosimetry. In some embodiments, the average bulk porosity % P can be in a range of 50%≤% P≤72%, 55%≤% P≤72%, 60%≤% P≤72%, or even 65%≤% P≤72%. Such ranges of porosity in the ceramic body 100 of the present disclosure can provide low backpressures when in used as plugged honeycomb bodies 100P for particulate filters, while providing adequate overall strength and thermal shock resistance.

In addition to the relatively high total porosities, ceramic bodies 100 of the present disclosure can also comprise a relatively narrow pore size distribution. The narrow pore size distribution can be evidenced by a minimized percentage of relatively fine pore sizes or relatively large pore sizes, or minimized percentage of both relatively fine and relatively large pore sizes in some embodiments. Such narrow pore size distribution has the advantage of providing low back pressure even when coated with a catalyst-containing washcoat. Further, narrow pore size distribution can be beneficial for providing low soot-loaded pressure drop as well as excellent soot capture efficiency when the ceramic body 100 is utilized in diesel and or gas engine exhaust filtration applications.

To this end, relative pore size distributions are determined by mercury intrusion porosimetry using the Washburn equation. For example, the quantity $d_{50}$ represents the median pore size (MPS) based upon pore volume (measured in micrometers). Thus, $d_{50}$ is the pore diameter at which 50% of the open porosity of the ceramic body 100 has been intruded by mercury. The quantity $d_{90}$ is the pore diameter at which 90% of the pore volume is comprised of pores whose diameters are smaller than the value of $d_{90}$; thus, $d_{90}$ is also equal to the pore diameter at which 10% by volume of the open porosity of the ceramic has been intruded by mercury. Still further, the quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury. The values of $d_{10}$ and $d_{90}$ are also expressed in units of micrometers.

d50

In accordance with an aspect of the disclosure, the porous walls 102 of the ceramic body 100, after firing, can comprise a median pore diameter ($d_{50}$) of $d_{50} \geq 10.0$ μm, $d_{50} \geq 12.0$ μm, $d_{50} 13.0$ μm, $d_{50} \geq 15.0$ μm, or even $d_{50} \geq 18.0$ μm in some embodiments. Further, the porous walls 102 of the ceramic body 100, after firing, can comprise a median pore diameter ($d_{50}$) that ranges as follows: 7 μm≤d50≤20 μm, 10 μm≤$d_{50}$≤20 μm, 12 μm≤$d_{50}$≤20 μm, or even 15 μm≤$d_{50}$≤20 μm in some embodiments.

df

The narrowness of the lower pore fraction (equal to and below $d_{50}$) of the pore size distribution of the open, interconnected porosity of the ceramic body 100 can be characterized by a d factor (df), wherein df={$(d_{50}-d_{10})/d_{50}$}. In example embodiments of the ceramic body 100, df may be df≤0.36, df≤0.32; df≤0.30, df≤0.25, or even df≤0.22. Exceedingly narrow pore size distribution embodiments described herein can exhibit d factor of df≤0.20, df≤0.18, or even df≤0.17. In some embodiments, the porous walls 102 of the ceramic body 100, after firing, can comprise df of 0.16≤df≤0.32; 0.16≤df≤0.30, 0.16≤df≤0.25, 0.16≤df≤0.22, or even 0.16≤df≤0.20.

dB

A relative measure of narrowness including a broader pore fraction of the pore size distribution (from $d_{10}$ to $d_{90}$) can be characterized by d breadth (dB) of the pore size distribution of the open, interconnected porosity of the ceramic body 100. For example, the d breadth (dB) of the pore size distribution of the open, interconnected porosity of the ceramic body 100 may be dB≤1.1, dB≤0.85, dB≤0.80, dB≤0.70, or even dB≤0.60 in some embodiments, wherein dB={$(d_{90}-d_{10})/d_{50}$}. In some embodiments, the porous walls 102 of the ceramic body 100, after firing, can comprise dB of 0.45≤dB≤1.1; 0.45≤dB≤0.85, 0.45≤dB≤0.70, 0.45≤dB≤0.60, or even 0.45≤dB≤0.55.

CTE

The coefficient of thermal expansion (CTE) of the ceramic body 100 comprising the ceramic was discovered to be quite low. According to example embodiments, it was discovered that the present ceramic material exhibits a low coefficient of thermal expansion resulting in excellent thermal shock resistance (TSR). As will be appreciated by one of ordinary skill in the art, TSR is inversely proportional to the coefficient of thermal expansion (CTE). That is, a ceramic body 100 with low thermal expansion can also have higher thermal shock resistance and may therefore survive wide temperature fluctuations that are encountered in engine exhaust filtration applications.

Accordingly, in example embodiments, the ceramic body 100 of the present disclosure comprising the ceramic phase composition described herein can exhibit a relatively-low coefficient of thermal expansion (CTE) in at least one direction, as measured by diiatometry. In particular, the CTE≤14×10$^{-7}$/°C., CTE≤12×10$^{-7}$/°C., CTE≤10×10$^{-7}$/°C., or even CTE≤9×10$^{-7}$/°C., can be achieved, all as measured across the temperature range of from 25° C. to 800° C. In some embodiments, the CTE across the temperature range of from 25° C. to 800° C. can range from 7×10$^{-7}$/°C.≤CTE≤14×10$^{-7}$/°C.; 7×10$^{-7}$/°C.≤CTE≤12×10$^{-7}$/°C.; or even 7×10$^{-7}$/°C.≤CTE≤10×10$^{-7}$/°C. In further embodiments, the CTE across the temperature range of from 25° C. to 800° C. can range from 3×10$^{-7}$/°C.≤CTE≤14×10$^{-7}$/°C., 3×10$^{-7}$/°C.≤CTE≤12×10$^{-7}$/°C., or even 3×10$^{-7}$/°C.≤CTE≤10×10$^{-7}$/°C., The ceramic body 100 can be characterized as a microcracked body comprising a microcrack index $Nb^3$ of greater than or equal to 0.10. In some embodiments, the microcrack index $Nb^3$ can be 0.10≤$Nb^3$≤0.43.

Combinations

Ceramic bodies 100 exhibiting combinations of the aforementioned average bulk porosity (% P), median pore diameter ($d_{50}$), low df and/or low dB, and low CTE (RT to 800° C.) can provide low clean and soot-loaded pressure drop while maintaining useful filtration efficiency and improved thermal shock resistance when the ceramic body 100 of the present disclosure is used in a diesel or gasoline exhaust filtration application.

Particularly effective examples of ceramic bodies 100 can comprise the ceramic composition as described herein and can further comprise average bulk porosity (% P) of the intersecting porous walls 102 of P %≥50%, a median pore size ($d_{50}$) of $d_{50}$≥7.0 μm, wherein $d_{50}$ is a median pore size of the ceramic body 100, df≤0.36 wherein df={$(d_{50}-d_{10})/d_{50}$}, and CTE≤14×10$^{-7}$/°C. as measured from room temperature 25° C. to 800° C. In some embodiments, the ceramic bodies 100 can comprise the ceramic composition as described herein and can further comprise average bulk porosity (% P) of the intersecting porous walls 102 of 50%≤P %≤72%, a median pore size ($d_{50}$) of 7.0 μm≤$d_{50}$≤20.0 μm, 0.16≤df≤0.36, and 3×10$^{-7}$/K≤CTE≤14×10$^{-7}$/°C.

Certain other example embodiments of the disclosure can comprise the ceramic composition as described herein and can further achieve 55%≥% P≥72%; 8 μm≤$d_{50}$≤20 μm; 0.16≥df≥0.32; and 3×10$^{-7}$/°C.≤CTE≤14×10$^{-7}$/°C., as measured between 25° C. and 800° C. Moreover, certain other example embodiments can achieve 60%≥% P≥72%; 10 μm≤$d_{50}$≤20 μm; 0.16≥df≥0.25; and 3×10$^{-7}$/°C.≤CTE≤13×10$^{-7}$/°C., as measured between 25° C. and 800° C.

Remarkably, some example embodiments can achieve 60%≥% P≥72%; 12 μm≤$d_{50}$≤20 μm; 0.16≥df≥0.20; and 3×10$^{-7}$/°C.≤CTE≤12×10$^{-7}$/°C., as measured between 25° C. and 800° C. Further example embodiments can achieve 60%≤% P≤72%; 13 μm≤$d_{50}$≤20 μm; 0.16≥df≥0.18; and 3×10$^{-7}$/°C.≤CTE≤12×10$^{-7}$/°C., as measured between 25° C. and 800° C. Such properties are exceedingly useful for use in particulate filters applications.

As briefly summarized above, example embodiments of the present disclosure provide a ceramic body 100 comprising a ceramic composite containing a predominant crystalline phase made up of a combination of cordierite and indialite, and a secondary crystalline phase comprising a solid-solution with a pseudobrookite structures phase. In particular, the ceramic body 100 comprises at least 85 wt % of combined crystalline phases containing cordierite and indialite, and up to 10 wt % of a secondary crystalline phase comprising the solid-solution pseudobrookite-structured phase. Other phases may be present.

The crystalline phases of cordierite and indialite collectively (when added together) can range from 85 wt % to 92 wt % based upon 100 wt % of the inorganics present. For example, in one or more embodiments, the crystalline phase of cordierite can range from 53 wt % to 78 wt % based upon 100 wt % of the inorganics present. The crystalline phase of indialite can range from 15 wt % to 35 wt % based upon 100 wt % of the inorganics present. In some embodiments, the pseudobrookite-structured phase in the ceramic body 100 can range from 2 wt % to 8 wt % based upon 100% of the inorganics present. The pseudobrookite-structured phase can comprise a crystalline phase of armalcolite.

Additionally, the ceramic body 100 can comprise an additional crystalline phase of mullite, which can range from 1.5 wt % to 3 wt % based upon 100% of the inorganics present. The ceramic body 100 should be substantially free of a crystalline phase of rutile. For example, the crystalline phase of rutile can amount to less than 1.0 wt % based upon 100 wt % of the inorganics present in the ceramic body 100. Some embodiments may include crystalline phases of enstatite or cristobalite, such as in less than 2.0 wt % based upon 100 wt % of the inorganics present. In some embodiments, the ceramic body 100 can comprise an amorphous phase of less than 7 wt % based upon 100 wt % of the inorganics present.

The weight percentages expressed herein as well as identification of the various phases that are present is accomplished by the Reitveld refinement method, and are expressed as a percentage of 100 of be total weight of the inorganics present in the ceramic body 100.

Figure 2:
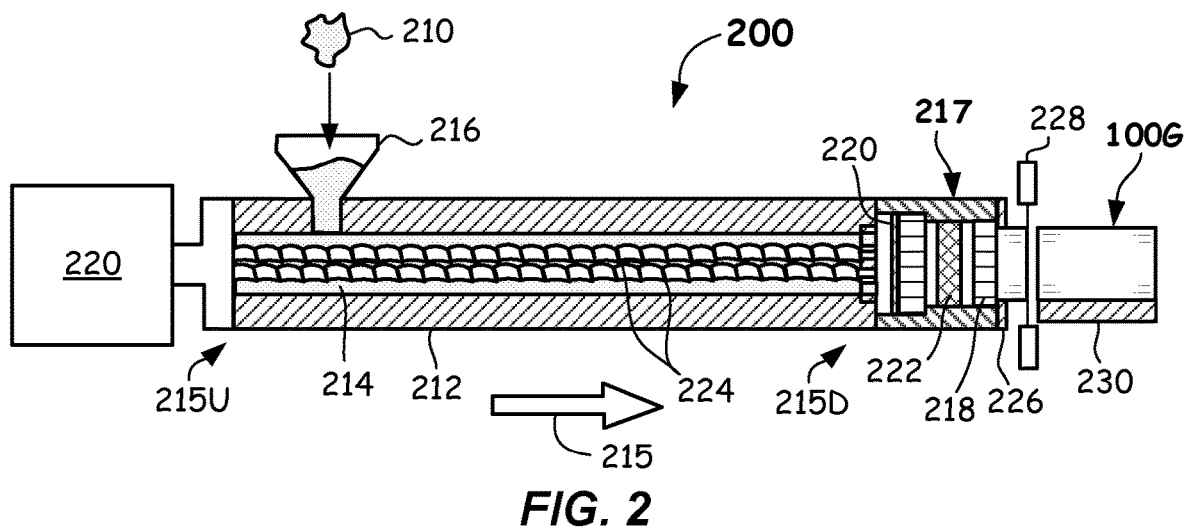
FIG. 2 illustrates a partially cross-sectioned side view of an extruder shown extruding a green honeycomb body according to embodiments of the disclosure.
Figure 3:
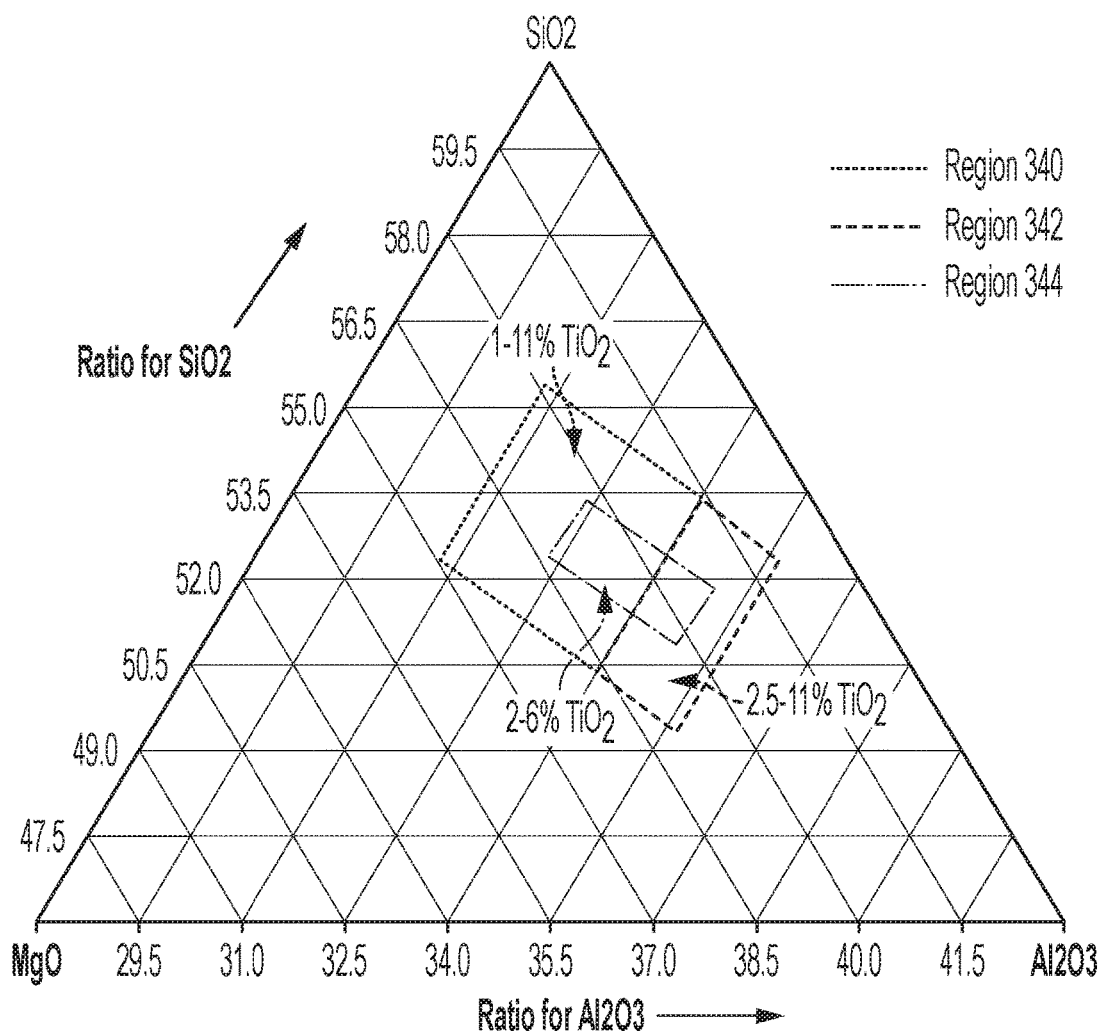
FIG. 3 illustrates a ternary plot of relative weight ratios of $MgO:Al_2O_3:SiO_2$ within the field (based on MgO, $Al_2O_3$, and $SiO_2$ totaling to 100%) according to embodiments of the disclosure.

Further, the ceramic body 100 can contain, as expressed in weight percent on an oxide basis, either:

1 wt % to 11 wt % titania and collectively 90 wt % to 99 wt % of MgO (magnesium oxide), $Al_2O_3$ (alumina), and $SiO_2$ (silica) that have relative weight ratios of MgO:$Al_2O_3$:$SiO_2$ within the field defined by 15.6:34.0:50.4, 12.6:34.0:53.4, 13.9:30.7:55.4, and 16.9:30.7:52.4, as best shown in region 340 of FIG. 3, or 2.5 wt % to 11 wt % titania and collectively 89 wt % to 97.5 wt % of MgO (magnesium oxide), $Al_2O_3$ (alumina), and $SiO_2$ (silica) that have relative weight ratios of MgO:$Al_2O_3$:$SiO_2$ within the field defined by 15.6:34.0:50.4, 12.6:34.0:53.4, 12.0:35.7:52.3, and 15.0:35.7:49.3, as best shown in region 342 of FIG. 3. As depicted and described, these relative weight ratios (MgO:$Al_2O_3$:$SiO_2$) add up to 100%.

Other embodiments, the ceramic body 100 comprises 2% wt % to 6 wt % titania and 94% wt % to 98% wt % MgO, $Al_2O_3$, and $SiO_2$ that have relative weight ratios of MgO:$Al_2O_3$:$SiO_2$ within the field defined by 14.3:34.9:50.8; 13.3:34.9:51.8; 14.3:32.3:53.4; and 15.3:32.3:52.4.

Thus, in terms of oxide concentration, the ceramic body 100 can comprise titania ranging from 1 wt % to 11 wt % in the embodiment having the MgO:$Al_2O_3$:$SiO_2$ oxide ratios bounded within the edge boundaries of region 340, and can comprise titania ranging from 2.5% to 11% in the in the embodiment having the oxide ratios MgO:$Al_2O_3$:$SiO_2$ bounded within edge boundaries of region 342.

The ceramic body 100 can further include an oxide concentration of titania ($TiO_2$) ranging from 1 wt % to 6 wt % in some embodiments, based on 100 wt % of the total inorganic oxides present in the ceramic body 100. In other embodiments, the ceramic body 100 can further comprise an oxide concentration of titania ($TiO_2$) ranging from 2 wt % to 6 wt %. Moreover, in terms of oxide weight percent, the ceramic body 100 can comprise an oxide concentration of magnesia (MgO) ranging from 12 wt % to 17 wt %, or even ranging from 12.5 wt % to 14 wt % in some embodiments, based on 100% of the total inorganic oxides present in the ceramic body 100.

It should be recognized that the presence of titania with the cordierite and indialite phases provides not only relatively high porosity (% P) and narrow pore size distribution, but also low CTE. Without being bound by theory, it is believed that the function of titania is to generate a stable liquid during reactive sintering that moves in response to capiilary forces to fill in the unwanted fine pores. Thus, the pore size distribution can be made narrower than nominally stoichiometric cordierite. Thus particulate filters utilizing the ceramic bodies 100 embodied as plugged honeycomb bodies 100P can have superior permeability, washcoat compatibiiity, and filtration efficiency.

Example embodiments of the ceramic bodies 100 of the disclosure may comprise E of less than or equal to 4.5 GPa, wherein E is the Young's modulus in GPa of the ceramic body 100 at room temperature (RT). In other example embodiments, the ceramic bodies 100 can have E less than or equal to 2.0 GPa. or even less than or equal to 1.5 GPa. In some embodiments, E can range from 1.33 GPa to 4.5 Gpa, or even from 1.3 GPa to 1.5 GPa, or even from 1.3 GPa to 2. GPa.

According to example embodiments of the disclosure, the ceramic bodies 100 demonstrate a preferred crystallographic texture of the cordierite phase that can be quantified by the i-rato which is computed from the (110) and (200) surface x-ray diffraction (XRD) peak intensities. For the axial i-ratio, XRD peak intensities were measured perpendicular to the wall 102 of the ceramic body 100. For the transverse i-ratio, XRD peak intensities were measured on a wall surface or slightly polished honeycomb wall surface, Rietveid deconvolution can be used to extract the cordierite peak intensities from contributions of overlapping peaks of the other phases present. In the exemplary embodiments of the disclosure, the cordierite phase of the ceramic bodies demonstrates axial i-ratios of 0.43-0.59 and transverse i-ratios of 0.80-0.88. In some embodiments, axial i-ratios can be less than 0.55 or even less than 0.5.

Extrusion Methods

Example embodiments of the present disclosure also provide methods of manufacturing cordierite-indialite-pseudobrookite composite ceramic bodies from a batch composition mixture comprising certain inorganic powdered raw materials, powdered organic materials, a liquid vehicle (e.g., water), and processing aids. The method comprises providing an inorganic batch composition mixture comprising sources of magnesia, alumina, silica; and titanic, that can comprise selected particle sizes (e.g., $d_{50}$ and dB) and weight percentages (wt %) as out fined herein. The inorganic batch composition mixture can then be mixed and/or mulled together with the organic powdered materials such as an organic binder, a pore former; the liquid vehicle; and one or more processing aid(s) selected from the group consisting of a plasticizer and lubricant, to form a plasticized batch composition mixture 210. The plasticized ceramic precursor batch composition mixture 210 can be shaped or otherwise formed into a green body 100G (See FIG. 2), such as a honeycomb green body. The green body 100G can then be dried and subsequently fired under conditions effective to convert the green body 100G into a ceramic body 100 comprising the afore-mentioned cordierite-indialite-pseudobrookite composite crystalline composition.

For example, the plasticized batch composition can be formed into the green body 100G by an extrusion method. For example, FIG. 2 illustrates a side cross-sectioned view of an example embodiment of an extruder 200 (e.g., a continuous twin-screw extruder). The extruder 200 includes a barrel 212 including a chamber 214 formed therein. The barrel 212 can be monolithic or it can be formed from a plurality of barrel segments connected successively in the longitudinal direction 215 (e.g., direction indicated by arrow). The chamber 214 extends through the barrel 212 in the longitudinal direction 215 between an upstream side 215U and a downstream side 215D. At the upstream side 215U of the barrel 212, a material supply port 216, which can include a hopper or other material supply structure, may be provided for supplying a batch composition mixture 210 to the extruder 200. A cartridge assembly 217 including a honeycomb extrusion die 218 is provided at the downstream side 215D for extruding the batch mixture 210 into a desired shape, such as the green honeycomb body 100G. The honeycomb extrusion die 218 can be preceded by other structures, such as a generally open cavity, screen 220, homogenizer 222, and the like to facilitate the formation of a steady plug-type flow front before the plasticized batch composition mixture 210 reaches the honeycomb extrusion die 218.

As further shown in FIG. 2, a pair of extruder screws 224 can be rotatably mounted in the barrel 212. The screws 224 may be arranged generally parallel to each other, as shown, though they may optionally be arranged at various angles relative to each other. The screws 224 may also be coupled to a driving mechanism 220 located outside of the barrel 212 for rotation of the screws 224 in the same or different directions. It is to be understood that both the screws 224 may be coupled to a single driving mechanism 220, as shown, or to individual driving mechanisms (not shown). The screws 224 operate to move the batch composition mixture 210 through the chamber 214 with pumping and further mixing action in the longitudinal direction 215. Further supporting structure may be provided to support the screws 224 at their ends and/or along their length. Such supporting structure may include perforations or holes therein to allow the batch composition mixture 210 to flow there through.

FIG. 2 additionally illustrates the extruder 200 with the green body 100G being extruded therefrom. An extruder cartridge 217 may include extrusion hardware such as the honeycomb extrusion die 218 and a skin forming mask 226. The green body 100G is extruded from the extruder 200, and in some embodiments the skin 106 surrounding the plurality of walls 102 is also formed during extrusion along with the plurality of walls 102. The honeycomb body 100G is then cut to length with a cutting element 228, and provided on a tray 230. The tray 230 can be as described in U.S. Pat. Nos. 9,085,089; 8,407,915, for example.

Cutting can be achieved by wire cutting, saw cutting, such as with a band saw or reciprocating saw, or other cutting method. The tray 232 can be provided to a dryer, such as described in U.S. Pat. Nos. 9,335,093, 7,596,885, and 6,259,078, for example. Any suitable drying method can be used, such as RF drying, microwave drying, oven drying, or combinations thereof. In some embodiments, the green honeycomb body 100G can be cut from a log from which multiple honeycomb bodies are provided, such as after drying.

After drying, the green body 100G can be fired under conditions effective to convert the green honeycomb body into a ceramic body 100 comprising a cordierite, indialite, and pseudobrookite and other crystalline phases.

Batch Composition

The batch composition mixture can comprise inorganic ingredients including a magnesia source, an alumina source, a silica source, and a titania source, a pore former (e.g., a starch and/or graphite), which may further include the particles sizes and particle size distributions and breadth (dBp) described in Table 1 below.

TABLE 1

Example Raw Batch Materials and Particle Sizes

| Raw Materials | Particle Sizes (μm) | | | |
|---|---|---|---|---|
| | $d_{p10}$ | $d_{p50}$ | $d_{p90}$ | $dB_p$ |
| Talc B | 4.92 | 15.13 | 36.53 | 2.09 |
| Talc C | 9.41 | 20.99 | 40.54 | 1.48 |
| Alumina 1 | 3.26 | 6.58 | 19.72 | 2.50 |
| Alumina 2 | 0.37 | 0.65 | 1.88 | 0.23 |
| Alumina 3 | 1.20 | 3.40 | 6.20 | 1.47 |
| Aluminum hydrate, Al(OH)$_3$ | 1.80 | 5.22 | 10.77 | 1.72 |
| Dispersible aluminum hydrate, AlOOH | 0.09 | 0.120 | 0.25 | −1.5 |
| Silica 1 | 0.96 | 5.14 | 16.78 | 3.08 |
| Silica 2 | 14.65 | 28.71 | 55.36 | 1.42 |
| Clay 1 | 2.40 | 7.30 | 17.20 | 2.03 |
| Clay 2 | 0.25 | 0.92 | 8.96 | 9.47 |
| Titania | 0.16 | 0.35 | 0.66 | 1.43 |
| Rice Starch | 3.43 | 6.08 | 10.70 | 1.20 |
| Corn Starch | 10.74 | 15.38 | 22.96 | 0.79 |
| Pea Starch | 17.71 | 25.59 | 38.75 | 0.82 |
| Potato Starch | 28.92 | 47.82 | 76.11 | 0.99 |
| Graphite | 3.03 | 8.01 | 16.63 | 1.70 |

To this end, as referred to herein, all particle sizes are measured by a laser diffraction technique and a Microtrac particle size analyzer with the exception of the dispersible alumina (AlOH) wherein the properties were defined by the supplier.

Magnesia Source

For example, the magnesia source can, for example and without limitation, be any suitable compound able to provide an oxide of magnesium useful in forming the cordierite-indialite-pseudobrookite structured crystalline phase composition. For example, the magnesia source can be selected as a talc source, or magnesium hydroxide, or combinations thereof. For example, the talc source can be calcined or un-calcined talc. Optionally, the magnesia source can be one or more of MgO, Mg(OH)$_2$, MdCO$_3$, MgAl$_2$O$_4$, Mg$_2$SiO$_4$, Mg$_2$TiO$_4$, MgTi$_2$O$_5$. Alternatively, the magnesia source can be selected from one or more of forsterite, olivine, chlorite, or serpentine. The magnesia source, when a talc, can have a median particle diameter ($d_{p50}$) in a range from about 6 μm to about 25 μm and can have $dB_p \leq 2.2$, wherein $dB_p$ is the breadth factor and is $(d_{p90}-d_{p10})/d_{p50}$. The magnesia source can comprise between 25 wt % and 40 wt % based on 100% of the total weight of the inorganics present in the batch composition mixture 210.

Alumina Source

The alumina source can, for example and without limitation, be any suitable compound able to provide an oxide of aluminum useful in forming the cordierite-indialite-pseudobrookite crystalline composition. The alumina source can be, for example, selected from an alumina-forming source such as corundum, an aluminum hydrate (or hydrated alumina) such as Al(OH)$_3$, a dispersible alumina such as boehmite that is capable of forming a colloidal suspension, diaspore, or a transition alumina such as gamma-alumina or rho-alumina. Alternatively, the alumina source can be a compound of aluminum with another metal oxide such as $MgAl_2O_4$, $Al_2TiO_5$, mullite, kaolin, calcined kaolin, phyrophyllite, kyanite, chlorite, etc. In some embodiments, the median particle size ($d_{p50}$) of the alumina source can be less than or equal to about 7.0 µm, and can be in the range from about 0.5 µm to about 7.0 µm. The alumina source can comprise between 25 wt % and 40 wt % based on 100% of the total weight of the inorganics present in the batch composition mixture 210.

Silica Source

The silica source can, for example and without limitation, be any suitable compound able to provide an oxide of silica useful in forming the cordierite-indialite-pseudobrookite crystalline composition. The silica source can, for example, be selected from a silica source such as a $SiO_2$ powder such as quartz, cryptocrystalline quartz, fused silica, diatomaceous silica, low-alkali zeolite, colloidal silica, or combinations thereof. Additionally, the silica source can also be provided as a compound with magnesium and/or aluminum, including for example, talc, cordierite, chlorite, kaolin, kyanite, and the like. In embodiments, the median particle size ($d_{50}$) of the silica source can range from about 4 µm to about 30 µm. The silica source can comprise between 15 wt % and 30 wt % based on 100% of the total weight of the inorganics present in the batch composition mixture 210.

Titania Source

The titania source can be provided as $TiO_2$ powder. Titania powders having the median particle sizes ($d_{p50}$) and/or the particle size distributions shown in Table 1 can be used. For example, the titania source can have a median particle size of from 0.25 µm to 0.45 µm. Further, the titania source can have a particle size distribution comprising a breadth factor $dB_p \leq 2.0$, or even $dB_p \leq 1.5$, wherein $dB_p = (d_{p90}-d_{p10})/d_{p50}$.

Pore Former

In order to achieve the relatively high average bulk porosity (% P≥50%) the batch composition mixture 210 can contain a pore-former to aid in tailoring the average bulk porosity and possibly the pore size distribution of the ceramic body 100. A pore former is a fugitive material, which evaporates or undergoes vaporization by combustion during drying and/or heating of the green body 100G to obtain a desired high bulk porosity, which can be coupled with a desired coarse median pore diameter ($d_{50}$) in the ceramic body 100. A suitable pore former can comprise, without limitation, carbon; graphite; starch; wood, shell, or nut flour; polymers such as polyethylene beads; and the like, and combinations of the aforementioned. Starches can comprise corn starch, rice starch, pea starch, sago starch, potato starch, and the like. Other suitable pore formers can be used. When certain pore formers are used, such as potato starch, combinations of relatively more ccoarse (e.g., larger $d_{p50}$) talc, alumina, and/or silica sources can be utilized to lower df.

Example embodiments that aid in providing useful combinations of relatively high porosity and relatively large $d_{50}$ can include combinations of starch and graphite. For example, the pore former can comprise pea starch alone or in combination with graphite, or corn starch alone or in combination with graphite. The pore former can be provided in the batch composition mixture 210 in an amount between about 25 wt % super addition ($SA_{pf}$) to about 57 wt % $SA_{pf}$ based upon 100% of the weight of the inorganics present in the batch composition mixture 210. Embodiments including combinations of starch of between 20 wt % $SA_{pf}$ to about 47 wt % $SA_{pf}$ and graphite of between 20 wt % $SA_{pf}$ to about 47 wt % $SA_{pf}$ based upon 100% of the weight of the inorganics present in the batch composition mixture 210 can provide excellent combinations of high average bulk porosity and median pore size ($d_{50}$) useful for filtration applications. The amount of pore former is computed as the $w_i \times$ wt % $SA_{pf}/100$, wherein $w_i$ is the total weight of inorganic raw materials.

The starch can have a median particle diameter ($d_{p50}$) in the range from about 5 µm to 50 µm, and from about 8 µm to 30 µm in other embodiments. The graphite can have a median particle diameter ($d_{p50}$) in the range from about 5 µm to 50 µm in some embodiments.

Organic Binder

The batch composition mixture 210 may include an organic binder. The organic binder may be, for example, a cellulose ether binder, such as a hydrophobically-modified cellulose ether binder. In some embodiments, the hydrophobically-modified cellulose ether binder may be, but not limited to, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, mixtures thereof, and the like. Methylcellulose and/or methylcellulose derivatives are especially suited as organic binders for use in the batch composition mixture 210, with methylcellulose and hydroxypropyl methylcellulose being excellent choices. Sources of cellulose ethers are METHOCEL™ cellulose products available from DOW® Chemical Co.

Some embodiments of the batch composition, such as those disclosed in Tables 2A-2E below, may comprise methylcellulose (methylcellulose 1) and hydroxypropyl methylcellulose (methylcellulose 2). Other combinations of cellulose ether binders may comprise cellulose ethers having different molecular weights. Alternatively, the combination of cellulose ethers may comprise cellulose ethers having different hydrophobic groups, different concentrations of the same hydrophobic group, or other cellulose ether combinations. Different hydrophobic groups may be, by way of non-limiting example, hydroxyethyl or hydroxypropyl. The organic binder, in some embodiments, may be a combination of a hydroxyethyl methylcellulose binder and a hydroxypropyl methylcellulose binder. Other suitable combinations of organic binders may be used.

The organic binder may be provided in the batch composition in an amount of about 2.0 wt % by SAP to 8.0 wt % by SA, or even about 3.0 wt % by SAP to about 5.0 wt % by SAP, wherein SAP is based on a superaddition to 100% of the total weight of the inorganics and pore formers that are present in the batch composition mixture 210.

Liquid Vehicle

In one or more embodiments, the batch composition mixture 210 comprises a liquid vehicle, which can be provided in a liquid vehicle percentage LV % as a superaddition to 100% of the weight of the inorganics and pore former present in the batch. The LV % in the batch composition mixture 210 may be added to the batch composition mixture in an amount of about 15 wt %≤LV %≤50 wt % by superaddition to 100% of the total weight of inorganics and pore former that are present in the batch composition mixture 210.

In use, the liquid vehicle provides a medium for the organic binder to dissolve in, and thus provides plasticity to the batch composition mixture 210 and also provides wetting of the inorganic particles therein. The liquid vehicle can be an aqueous-based liquid, such as water or water-miscible solvents. In one implementation, the liquid vehicle is water, such as deionized water, but other solvents such as alcohols (e.g., methanol or ethanol) could be used alone or in combination with water.

Processing Aids

Still further, the batch composition mixture 210 can comprise other processing aids such as plasticizers, surfactants, and/or oil lubricants, Non-limiting examples of surfactants that can be used as processing aids are $C_8$ to $C_{22}$ fatty acids, and/or their derivatives, Additional surfactant components that may be used with these fatty acids are $C_8$ to $C_{22}$ fatty esters, $C_8$ to $C_{22}$ fatty alcohols, and combinations of these. Exemplary surfactants are stearic, lauric, myristic, oleic, linoleic, and palmitic acids, and their derivatives, tall oil, stearic acid in combination with ammonium lauryl sulfate, and combinations of all of these. In an illustrative embodiment, the surfactant is lauric acid, stearic acid, oleic acid, tail oil, or combinations of the aforementioned. In some embodiments, the amount of surfactants can range from about 0.25 wt % by SA to about 2 wt % by SA, and from about 0.5 wt % by SA and 1.5 wt % by SA in the depicted embodiments.

Non-limiting examples of oil lubricants that could be used as forming aids can include light mineral oil, corn oil, high molecular weight polybutenes, polyol esters, a blend of light mineral oil and wax emulsion, a blend of paraffin wax in corn oil, or combinations of these and olefins. In some embodiments, the amount of oil lubricants can be from about 0 wt % SA to about 10 wt % SA. In some example embodiments, the oil lubricants can be present up to about 2 wt % SA. In some embodiments, no lubricants are used.

The inorganic batch powdered ingredients, organic binder, and pore former, can be intimately blended with a liquid vehicle and one or more processing aids to impart plastic formability and green strength to the plasticized batch composition mixture upon being shaped into a green body 100G. When forming is done by extrusion, most typically a cellulose ether binder such as methylcellulose, hydroxypropyl methylcellulose, and/or combinations thereof, serve as the temporary organic binder. Tall oil can serve as a suitable processing aid. The inorganic batch ingredients, organic binder, and pore former are typically mixed together in dry form and then mixed with the liquid vehicle (e.g. water) and the one or more processing aid(s). The amount of liquid vehicle (e.g., water) can vary from one batch composition mixture to another and therefore can be determined by pre-testing the particular batch composition mixture for extrudability, and adjusting, as needed, the liquid vehicle LV % to achieve a proper plasticity for extrusion and optimum handling properties.

In addition to the forming and shaping of the green body 100G from the plasticized batch composition mixture by extrusion, other suitable forming methods could be used. For example, uniaxial or isostatic pressing, casting, and injection molding may be used to form the green body 100G. For example, extrusion can be used when the ceramic body 100 is embodied as a honeycomb body, such as when embodied for use as a catalytic converter flow-through substrate (e.g., a catalyzed substrate) or a plugged honeycomb body for use in a particulate wall-flow filter application. The resulting green body 100G can be dried, and then fired in a furnace, such as a gas or electric kiln, under conditions effective to convert the green body 100G into a ceramic body 100. After firing, the ceramic body 100 may be plugged as discussed herein to form a plugged ceramic body 100P.

Firing

In one or more embodiments, the firing conditions effective to convert the green body 100G into a ceramic body 100 can comprise heating the green body 100G to a maximum soak temperature in the range of from 1,350° C. to 1410° C. and then holding at the maximum soak temperature for a soak time sufficient to produce the cordierite-indialite-pseudobrookite crystalline phase composite structure. In some embodiments, the maximum soak temperature can even be in the range of from 1360° C. to 1400° C. or 1380 to 1395° C. The maximum soak temperature is maintained for a soak time sufficient to convert the green body 100G into a ceramic body 100 comprising the cordierite-indialite-pseudobrookite crystalline phase composite structure. The soak time can be from about 6 hours to about 24 hours, for example. The soak time is followed by cooling at a rate sufficient slow so as not to thermally shock the ceramic body 100.

Plugging

To obtain a plugged honeycomb body 100P for use in a wall-flow particulate filter application, a portion of the cells of the ceramic honeycomb body 100 at the inlet end and/or face can be plugged, as is known in the art. The plugging may be at the ends of the channels 104, which can be to a depth of about 3 mm to 20 mm, although this depth can vary. In some embodiments, a portion of the channels 104 on the outlet end 105 are plugged, but not at the inlet end 103 (e.g., inlet channels), and another portion of the channels 104 on the inlet end 103 are plugged, but not at the outlet end 105 (e.g., outlet channels). Therefore, each channel 104 is plugged only at one end in fully-plugged embodiments. In some embodiments, a plugging arrangement can be provided to have every other channel 104 on a given face plugged in a checkered pattern. However, other plugging patterns are possible and not all channels 104 may contain plugs. Some channels 104 may not include plugs, i.e., may be unplugged flow-through channels. Suitable non-limiting plugging materials and plugging processes are described in U.S. Pat. Nos. 4,329,162; 4,557,773, 6,673,300, 7,744,669, and 7,922,951, for example. Other suitable plugging methods, patterns, and plug types may be used.

Example Batch Composition Mixtures

Example embodiments of the disclosure are further described below with respect to certain batch composition mixtures, which are illustrative only and not intended to be limiting. Tables 2A-2E below provide some examples (E1-E27) of batch composition mixtures 210 useful in forming ceramic bodies 100 comprising the cordierite-indialite-pseudobrookite structured composite ceramic. In particular, example batch mixtures 210 in accordance with embodiments described herein can comprise inorganic ingredients comprising a magnesia source, an alumina source, a silica source, and a titania source, which can be powdered particulate source materials or the like. The magnesia source can be provided in the batch composition mixture in a range from 20 wt % to 42 wt %; the alumina source in a range from 25 wt % to 40 wt %; the silica source a range from 15 wt % to 30 wt %; and the titania source a range from 1 wt % to 10 wt %, wherein the wt % of each of the magnesia source, alumina source, silica source, and titania source are all based on 100% of a total weight of the inorganics that are present in the batch composition mixture 210, i.e., the respective inorganic ingredients add to 100%.

When the magnesia source is a talc source is provided to the batch composition mixture as a powered particulate talc material, it can be provided in accordance with one of the talc particle distributions and materials shown in Table 1, for example. The alumina source can be any suitable source of alumina and/or aluminum hydrate, such from calcined alumina, hydrated alumina, or even clay, such as kaolin clay. Other types of day may be used, such as halloysite or attapulgite. In some embodiments, the alumina source can comprise a calcined alumina particulate material in a range from 11 wt % to 33 wt %; and hydrated alumina in a range from 0 wt % to 16 wt %, each based on 100% of the total weight of the inorganics in the batch composition mixture 210.

The silica source can be derived from particulate silica, from clay, such as kaolin clay, or from talc, or combinations thereof. The titania source can be any source of particulate titania ($TiO_2$), as described above.

The batch composition mixture further comprises a pore former provided in a range from 26 wt % $SA_{pf}$ to 56 wt % $SA_{pf}$, or even from 35 wt % $SA_{pf}$ to 56 wt % $SA_{pf}$, wherein wt % SA is weight percent by superaddition based on 100% of the total weight of the inorganics in the batch composition mixture 210. In some embodiments, the pore former is provided in a range of from 44 wt % $SA_{pf}$ to 56 wt % $SA_{pf}$. In further embodiments, the pore former can comprise pea starch in a range from 44 wt % $SA_{pf}$ to 51 wt % $SA_{pf}$. An example pea starch can have a median particle size ($d_{50}$) and particle size distribution as shown in Table 1, and/or as otherwise described herein.

In some embodiments, the pore former comprises only starch or a combination of starch and graphite. For example, the pore former can comprise from 44 wt % $SA_{pf}$ to 46 wt % $SA_{pf}$ pea starch and from 9 wt % $SA_{pf}$ to 11 wt % $SA_{pf}$ graphite, wherein wt % $SA_{pf}$ is weight percent by superaddition based on 100% of the total weight of the inorganics in the batch composition mixture 210.

TABLE 2A

Example Batch Composition Mixtures E1-E6

| Inorganics (wt %) | E1 | E2 | E3 | E4 | E5 | E6 |
|---|---|---|---|---|---|---|
| Talc C | 41.68 | 41.26 | 40.84 | 40.42 | 40.42 | 40.42 |
| Alumina 2 | 19.14 | 18.95 | 18.75 | 18.56 | 18.56 | 18.56 |
| Aluminum Hydrate (AH) | 15.84 | 15.68 | 15.52 | 15.36 | 15.36 | 15.36 |
| Total Alumina + AH | 34.98 | 34.63 | 34.27 | 33.92 | 33.92 | 33.92 |
| Silica 1 | 22.34 | 22.12 | 21.89 | 21.66 | 21.66 | 21.66 |
| Titania | 1.00 | 2.00 | 3.00 | 4.00 | 4.00 | 4.00 |
| Total | 100.00 | 100.00 | 100.00 | 100.00 | 100.00 | 100.00 |
| Pore Former (wt % $SA_{pf}$) | | | | | | |
| Pea Starch | 45.0 | 45.0 | 45.0 | 45.0 | 47.8 | 50.5 |
| Graphite | 10.0 | 10.0 | 10.0 | 10.0 | 5.00 | — |
| Binder (wt % SA) | | | | | | |
| Methylcellulose 1 | — | 3.5 | — | 3.5 | 3.5 | 3.5 |
| Methylcellulose 2 | 3.5 | — | 3.5 | — | — | — |
| Process Aid (wt % SA) | | | | | | |
| Fatty acid 2 | 1.0 | 1.0 | 1.0 | 1.0 | 1.0 | 1.0 |

TABLE 2B

Example Batch Composition Mixtures E7-E10

| Inorganics (wt %) | E7 | E8 | E9 | E10 |
|---|---|---|---|---|
| Talc B | — | 40.00 | — | — |
| Talc C | 40.00 | — | 40.00 | 40.00 |
| Alumina 2 | 18.37 | 18.37 | 18.37 | 18.37 |
| Aluminum Hydrate (AH) | 15.20 | 15.20 | 15.20 | 15.20 |
| Total Alumina + AH | 33.57 | 33.57 | 33.57 | 33.57 |
| Silica 1 | 21.44 | 21.44 | 21.44 | 21.44 |
| Titania | 5.00 | 5.00 | 5.00 | 5.00 |
| Total | 100.00 | 100.00 | 100.00 | 100.00 |
| Pore Formers | | | | |
| Corn Starch | — | — | 45 | — |
| Pea Starch | 45.0 | 45.0 | — | 22.0 |
| Graphite | 10.0 | 10.0 | 10.0 | 5.0 |
| Binders | | | | |
| Methylcellulose 1 | — | 3.5 | 3.5 | 3.5 |
| Methylcellulose 2 | 3.5 | — | — | — |
| Liquids | | | | |
| Fatty acid 2 | 1.0 | 1.0 | 1.0 | 1.0 |

TABLE 2C

Example Batch Composition Mixtures E11-E16

| Inorganics/Ex. No. | E11 | E12 | E13 | E14 | E15 | E16 |
|---|---|---|---|---|---|---|
| Talc C | 39.65 | 38.87 | 40.32 | 39.50 | 38.44 | 37.66 |
| Alumina 2 | 16.33 | 11.86 | 19.75 | 19.35 | 21.35 | 2092. |
| Aluminum Hydrate (AH) | 15.20 | 15.20 | 15.68 | 15.36 | 15.68 | 15.36 |
| Total Alumina + AH | 31.53 | 27.06 | 35.11 | 34.71 | 37.03 | 36.28 |
| Silica 1 | 19.08 | 13.88 | 22.25 | 21.79 | 22.53 | 22.07 |
| Titania | 5.00 | 5.00 | 2.00 | 4.00 | 2.00 | 4.00 |
| Clay 2 | 4.75 | 15.20 | — | — | — | — |
| Total | 100.00 | 100.00 | 100.00 | 100.00 | 100.00 | 100.00 |
| Pore Formers | | | | | | |
| Pea Starch | 45.0 | 45.0 | 45.0 | 45.0 | 45.0 | 45.0 |
| Potato Starch | — | | | | | |
| Graphite | 10.0 | 10.0 | 10.0 | 10.0 | 10.0 | 10.0 |
| Binders | | | | | | |
| Methylcellulose 1 | — | — | 3.5 | 3.5 | 3.5 | 3.5 |
| Methylcellulose 2 | 3.5 | 3.5 | — | — | — | — |
| Liquids | | | | | | |
| Fatty acid 2 | 1.0 | 1.0 | 1.0 | 1.0 | 1.0 | 1.0 |

TABLE 2D

Example Batch Composition Mixtures

| Inorganics/Ex. No. | E17 | E18 | E19 | E20 | E21 | E22 |
|---|---|---|---|---|---|---|
| Talc C | 37.66 | 37.66 | 39.87 | 39.87 | 39.87 | 37.26 |
| Alumina 1 | — | — | — | — | 32.67 | — |
| Alumina 2 | 2092. | 20.92 | 32.67 | — | — | 20.70 |
| Alumina 3 | — | — | — | 32.67 | — | — |

TABLE 2D-continued

Example Batch Composition Mixtures

| Inorganics/Ex. No. | E17 | E18 | E19 | E20 | E21 | E22 |
|---|---|---|---|---|---|---|
| Aluminum hydrate | 15.36 | 15.36 | — | — | — | 15.20 |
| Total Alumina + AH | 36.28 | 36.28 | 32.67 | 32.67 | 32.67 | 35.90 |
| Silica 1 | 22.07 | 22.07 | 23.46 | 23.46 | 23.46 | 21.84 |
| Titania | 4.00 | 4.00 | 4.00 | 4.00 | 4.00 | 5.00 |
| Total | 100.00 | 100.00 | 100.00 | 100.00 | 100.00 | 100.00 |
| Pore Formers | | | | | | |
| Pea Starch | 47.8 | 50.5 | 50.5 | 50.5 | 50.5 | 45.0 |
| Graphite | 5.0 | — | — | — | — | 10.0 |
| Binders | | | | | | |
| Methylcellulose 2 | 3.5 | 3.5 | 3.5 | 3.5 | 3.5 | 3.5 |
| Liquids | | | | | | |
| Fatty acid 2 | 1.0 | 1.0 | 1.0 | 1.0 | 1.0 | 1.0 |

TABLE 2E

Example Batch Composition Mixtures E23-E28

| Inorganics/Ex. No. | E23 | E24 | E25 | E26 | E27 | E28 |
|---|---|---|---|---|---|---|
| Talc C | 36.93 | 36.20 | 38.39 | 37.89 | 37.66 | 37.49 |
| Alumina 2 | 18.65 | 14.12 | 25.38 | 17.40 | 20.92 | 19.18 |
| Aluminum Hydrate (AH) | 15.20 | 15.20 | — | 14.40 | 15.36 | 15.36 |
| Colloidal alumina (AD) | — | — | — | — | — | 2.00 |
| Total Alumina + AH + AD | 33.85 | 29.32 | 25.38 | 31.80 | 36.28 | 36.54 |
| Silica 1 | 19.47 | 14.28 | 15.23 | 20.31 | — | 6.59 |
| Silica 2 | — | — | — | — | 22.07 | 15.38 |
| Titania | 5.00 | 5.00 | 5.00 | 10.00 | 4.00 | 4.00 |
| Clay 1 | — | — | 16.00 | — | — | — |
| Clay 2 | 4.75 | 15.20 | — | — | — | — |
| Total | 100.00 | 100.00 | 100.00 | 100.00 | 100.00 | 100.00 |
| Pore Formers | | | | | | |
| Corn Starch | — | — | 25.0 | — | — | — |
| Pea Starch | 45.0 | 45.0 | — | 45.0 | 50.5 | 43.1 |
| Graphite | 10.0 | 10.0 | — | 10.0 | — | — |
| Binders | | | | | | |
| Methylcellulose 2 | 3.5 | 3.5 | 3.5 | 3.5 | 3.5 | 3.5 |
| Liquids | | | | | | |
| Fatty acid 2 | 1.0 | 1.0 | 1.0 | 1.0 | 1.0 | 1.0 |

Tables 3A-3G below show nominal oxide chemistry, processing details, microstructural geometry and properties, and various phase composition as phase fractions in weight percent (wt %) of example ceramic bodies E1A-E28 after firing that are manufactured from batch composition mixtures 210 utilizing raw materials from Table 1 and the batch composition mixtures as defined by Tables 2A-2E.

Each of the examples E1A-E28 in Tables 3A-3G, which correspond to examples E1-E28 in Table 2A-2E, were obtained by extruding honeycomb green bodies 100G having an axial length from about 200 mm to 305 mm and a nominal diameter of 54 mm in transverse cross-section, a cell density of 46.6 cells per cm$^2$ and a wall thickness of 0.20 mm to 0.23 mm). These honeycomb green bodies 100G are made from the various listed batch materials from Tables 2A-2E are then fired in an electric furnace at the listed firing conditions. The top soak temperature (° C.) and soak time in hours (hr) are shown.

Calculated oxide weight percentages for the various sources are shown, Phase fractions of the various phases present in the cordierite-indialite-pseudobrookite (CID) composite ceramic are shown. For example, E2 contains cordierite, indialite, spinel, enstatite, armalcolite as the pseudobrookite structure, rutile, and an amorphous phase. The phase fractions of all examples E1A-E28 were determined by Reitved refinement method and X-ray diffraction.

TABLE 3A

Nominal oxide chemistry, processing details, properties, and phase composition of example ceramic bodies E1A-E3B after firing

| Nominal Oxide Chemistry | E1A | E1B | E1C | E2 | E3A | E3B |
|---|---|---|---|---|---|---|
| Weight Percent MgO | 14.36 | 14.36 | 14.36 | 14.20 | 14.05 | 14.05 |
| Weight Percent $Al_2O_3$ | 31.87 | 31.87 | 31.87 | 31.52 | 31.17 | 31.17 |
| Weight Percent $SiO_2$ | 52.69 | 52.69 | 52.69 | 52.11 | 51.54 | 51.54 |
| Weight Percent $TiO_2$ | 1.08 | 1.08 | 1.08 | 2.16 | 3.24 | 3.24 |
| Total Weight Percent | 100.00 | 100.00 | 100.00 | 100.00 | 100.00 | 100.00 |
| Processing and Attributes | | | | | | |
| Soak Temperature (° C.) | 1380 | 1390 | 1400 | 1380 | 1380 | 1390 |
| Soak Time (hr) | 12 | 12 | 12 | 12 | 12 | 12 |
| Avg. Porosity (%) | 70.16 | 70.07 | 69.75 | 68.55 | 69.52 | 69.02 |
| $d_{10}$ (µm) | 8.38 | 8.81 | 9.13 | 8.19 | 9.57 | 9.78 |
| $d_{50}$ | 11.85 | 12.36 | 12.54 | 11.70 | 12.58 | 12.90 |
| $d_{90}$ | 18.12 | 17.90 | 17.47 | 15.92 | 18.14 | 18.71 |
| $d_f$ | 0.29 | 0.29 | 0.27 | 0.30 | 0.24 | 0.24 |
| $d_b$ | 0.82 | 0.74 | 0.67 | 0.66 | 0.68 | 0.69 |
| CTE 25° C. to 800° C. ($\times 10^{-7}$/° C.) | 10.00 | 10.00 | 9.70 | 10.00 | 9.50 | 9.40 |
| E (GPa) | — | — | — | 1.39 | — | — |
| $E_w$ (GPa) | — | — | — | 4.31 | — | — |
| $E_{wNMC}$ (GPa) | — | — | — | 6.37 | — | — |
| $Nb^3$ | — | — | — | 0.27 | — | — |
| I-Ratios | | | | | | |
| Axial | — | — | — | 0.47 | — | — |
| Powder | — | — | — | 0.67 | — | — |
| Transverse | — | — | — | 0.84 | — | — |
| Phases by Rietveld | | | | | | |
| Cordierite | — | — | — | 72.3 | — | — |
| Indialite | — | — | — | 16.8 | — | — |
| Cordierite + Indialite | — | — | — | 89.1 | — | — |
| Spinel | — | — | — | 0.5 | — | — |
| Enstatite | — | — | — | 1.5 | — | — |
| Pseudobrookite Structured Phase | — | — | — | 2.6 | — | — |
| Rutile | — | — | — | 0.3 | — | — |
| Amorphous Phase | — | — | — | 6.0 | — | — |

TABLE 3B

Nominal oxide chemistry, processing details, properties, and phase composition of example ceramic bodies E3C-E7B after firing

| Nominal Oxide Chemistry | E3C | E4 | E5 | E6 | E7A | E7B |
|---|---|---|---|---|---|---|
| Weight Percent MgO | 14.05 | 13.89 | +13.89 | 13.89 | 13.74 | 13.74 |
| Weight Percent $Al_2O_3$ | 31.17 | 30.83 | 30.83 | 30.83 | 30.48 | 30.48 |

TABLE 3B-continued

Nominal oxide chemistry, processing details, properties, and phase composition of example ceramic bodies E3C-E7B after firing

| Nominal Oxide Chemistry | E3C | E4 | E5 | E6 | E7A | E7B |
|---|---|---|---|---|---|---|
| Weight Percent $SiO_2$ | 51.54 | 50.97 | 50.97 | 50.97 | 50.39 | 50.39 |
| Weight Percent $TiO_2$ | 3.24 | 4.31 | 431 | 4.31 | 5.39 | 5.39 |
| Processing and Attributes | | | | | | |
| Soak Temperature (° C.) | 1400 | 1380 | 1380 | 1380 | 1360 | 1370 |
| Soak Time (hr) | 12 | 12 | 12 | 12 | 12 | 12 |
| Porosity (%) | 67.68 | 67.74 | 68 58 | 68.09 | 68.77 | 67.80 |
| $d_{10}$ (μm) | 11.74 | 9.99 | 11.02 | 11.38 | 10.20 | 11.16 |
| $d_{50}$ | 14.19 | 12.83 | 13.59 | 13.63 | 12.95 | 13.80 |
| $d_{90}$ | 19.51 | 18.72 | 18.64 | 18.67 | 17.65 | 19.03 |
| $d_f$ | 0.17 | 0.22 | 0.19 | 0.17 | 0.21 | 0.19 |
| $d_b$ | 0.55 | 0.68 | 0.56 | 0.53 | 0.58 | 0.57 |
| CTE to 800° C. ($\times 10^{-7}$/° C.) | 9.40 | 10.40 | 9.50 | 10.00 | 11.10 | 11.80 |
| E (GPa) | — | 1.52 | 1.43 | 1.43 | — | — |
| $E_w$ (GPa) | — | 4.74 | 4.39 | 4.46 | — | — |
| $E_{w,NMC}$ (GPa) | — | 6.67 | 6.28 | 6.50 | — | — |
| $Nb^3$ | — | 0.23 | 0.24 | 0.26 | — | — |
| I-Ratios | | | | | | |
| Axial | — | 0.49 | 0.47 | 0.48 | — | — |
| Powder | — | 0.66 | 0.66 | 0.65 | — | — |
| Transverse | — | 0.85 | 0.84 | 0.85 | — | — |
| Phases by Rietveld | | | | | | |
| Cordierite | — | 66.2 | 67.6 | 68.0 | — | — |
| Indialite | — | 23.3 | 23.4 | 23.0 | — | — |
| Cordierite + Indialite | — | 89.5 | 91.0 | 91.0 | — | — |
| Pseudobrookite Structured Phase | — | 4.8 | 4.7 | 4.8 | — | — |
| Rutile | — | 0.4 | 0.4 | 0.4 | — | — |
| Amorphous Phase | — | 5.3 | 3.9 | 3.8 | — | — |

TABLE 3C

Nominal oxide chemistry, processing details, properties, and phase composition of example ceramic bodies E7C-E10 after firing

| Nominal Oxide Chemistry | E7C | E7D | E8 | E9 | E10 |
|---|---|---|---|---|---|
| Weight Percent MgO | 13.74 | 13.74 | 13.74 | 13.74 | 13.74 |
| Weight Percent $Al_2O_3$ | 30.48 | 30.48 | 30.48 | 30.48 | 30.48 |
| Weight Percent $SiO_2$ | 50.39 | 50.39 | 50.39 | 50.39 | 50.39 |
| Weight Percent $TiO_2$ | 5.39 | 5.39 | 5.39 | 5.39 | 5.39 |
| Processing and Attributes | | | | | |
| Soak Temperature (° C.) | 1380 | 1390 | 1380 | 1380 | 1380 |
| Soak Time (hr) | 12 | 12 | 12 | 12 | 12 |
| Avg. Porosity (%) | 67.89 | 65.38 | 65.97 | 66.49 | 56.61 |
| $d_{10}$ (μm) | 11.45 | 12.08 | 10.75 | 9.07 | 7.67 |
| $d_{50}$ | 14.04 | 14.45 | 13.51 | 10.88 | 10.83 |
| $d_{90}$ | 20.25 | 19.42 | 19.13 | 15.50 | 15.96 |
| $d_f$ | 0.18 | 0.16 | 0.20 | 0.17 | 0.29 |
| $d_b$ | 0.63 | 0.51 | 0.62 | 0.59 | 0.77 |
| CTE 25° C. to 800° C. ($\times 10^{-7}$/° C.) | 11.00 | 11.30 | 11.90 | 13.10 | 8.80 |
| E (GPa) | — | — | 1.79 | 1.44 | 3.10 |
| $E_w$ (GPa) | — | — | 5.71 | 4.42 | 9.66 |
| $E_{w,NMC}$ (GPa) | — | — | 7.71 | 5.43 | 17.01 |
| $Nb^3$ | — | — | 0.20 | 0.13 | 0.43 |
| I-Ratios | | | | | |
| Axial | — | — | 0.47 | 0.49 | 0.47 |
| Powder | — | — | 0.67 | 0.66 | 0.68 |
| Transverse | — | — | 0.84 | 0.84 | 0.87 |
| Phases by Rietveld % | | | | | |
| Cordierite | 57.3 | — | 63.8 | 63.8 | 62.5 |
| Indialite | 31.5 | — | 27.2 | 25.8 | 28.1 |
| Cordierite + Indialite | 88.8 | — | 91.0 | 89.6 | 90.6 |
| Pseudobrookite Structured Phase | 6.1 | — | 5.4 | 5.8 | 6.2 |
| Rutile | 0.2 | — | 0.7 | 0.4 | 0.4 |
| Cristobalite | — | — | — | — | 1.1 |
| Amorphous Phase | 4.9 | — | 2.8 | 4.1 | 1.8 |

TABLE 3D

Nominal oxide chemistry, processing details, properties, and phase composition of example ceramic bodies E11-E15 after firing

| Nominal Oxide Chemistry | E11 | E12 | E13 | E14 | E15 |
|---|---|---|---|---|---|
| Weight Percent MgO | 13.71 | 13.65 | 13.87 | 13.57 | 13.21 |
| Weight Percent $Al_2O_3$ | 30.52 | 30.62 | 32.38 | 31.66 | 34.08 |
| Weight Percent $SiO_2$ | 50.34 | 50.22 | 51.59 | 50.46 | 50.55 |
| Weight Percent $TiO_2$ | 5.42 | 5.51 | 2.16 | 4.31 | 2.16 |
| Processing and Attributes | | | | | |
| Soak Temperature (° C.) | 1380 | 1380 | 1380 | 1380 | 1380 |
| Soak Time (hr) | 12 | 12 | 12 | 12 | 12 |
| Avg. Porosity (%) | 66.38 | 65.43 | 67.9 | 68.03 | 68.52 |
| $d_{10}$ (μm) | 10.59 | 10.50 | 7.14 | 9.31 | 6.80 |
| $d_{50}$ | 13.05 | 12.75 | 10.97 | 12.26 | 10.64 |
| $d_{90}$ | 17.98 | 17.10 | 15.64 | 16.58 | 14.67 |
| $d_f$ | 0.19 | 0.18 | 0.35 | 0.24 | 0.36 |
| $d_b$ | 0.57 | 0.52 | 0.77 | 0.59 | 0.74 |
| CTE 25° C. to 800° C. ($\times 10^{-7}$/° C.) | 12.60 | 12.10 | 9.80 | 9.90 | 7.60 |
| E (GPa) | — | — | 1.63 | 1.61 | 1.43 |
| $E_w$ (GPa) | — | — | 5.05 | 4.97 | 4.41 |
| $E_{w,NMC}$ (GPa) | — | — | 6.48 | 6.90 | 6.43 |
| $Nb^3$ | — | — | 0.16 | 0.22 | 0.26 |
| I-Ratios | — | — | — | — | — |
| Axial | 0.53 | 0.54 | 0.46 | 0.46 | 0.47 |
| Powder | 0.67 | 0.67 | 0.66 | 0.66 | 0.67 |
| Transverse | 0.83 | 0.82 | 0.84 | 0.82 | 0.84 |
| Phases by Rietveld | | | | | |
| Cordierite | 62.4 | 59.3 | 76.8 | 67.1 | 76.8 |
| Indialite | 28.4 | 30.2 | 17.2 | 23.7 | 16.4 |
| Cordierite + Indialite | 90.8 | 89.5 | 94.0 | 90.8 | 93.2 |
| Mullite | — | — | — | — | 1.8 |
| Pseudobrookite Structured Phase | 6.2 | 6.6 | 2.7 | 5.1 | 2.6 |
| Rutile | 0.4 | 0.2 | 0.1 | 0.2 | 0.2 |
| Amorphous Phase | 2.6 | 3.7 | 3.3 | 3.9 | 2.1 |

TABLE 3E

Nominal oxide chemistry, processing details, properties, and phase composition of example ceramic bodies E16-E21 after firing

| Nominal Oxide Chemistry | E16 | E17 | E18 | E19 | E20 | E21 |
|---|---|---|---|---|---|---|
| Weight Percent MgO | 12.92 | 12.92 | +12.92 | 12.96 | 12.96 | 12.96 |
| Weight Percent $Al_2O_3$ | 33.33 | 33.33 | 33.33 | 33.30 | 33.30 | 33.30 |
| Weight Percent $SiO_2$ | 49.44 | 49.44 | 49.44 | 49.66 | 49.66 | 49.66 |
| Weight Percent $TiO_2$ | 4.31 | 4.31 | 431 | 4.08 | 4.08 | 4.08 |
| Processing and Attributes | | | | | | |
| Soak Temperature (° C.) | 1380 | 1380 | 1380 | 1380 | 1380 | 1380 |
| Soak Time (hr) | 12 | 12 | 12 | 12 | 12 | 12 |
| Avg. Porosity (%) | 67.80 | 69.14 | 68.83 | 67.56 | 69.07 | 69.22 |
| $d_{10}$ (μm) | 9.51 | 9.73 | 10.62 | 10.01 | 13.25 | 15.81 |
| $d_{50}$ | 12.42 | 12.49 | 12.94 | 12.58 | 15.82 | 19.16 |
| $d_{90}$ | 16.89 | 16.40 | 17.21 | 16.44 | 22.90 | 31.87 |
| $d_f$ | 0.23 | 0.22 | 0.18 | 0.20 | 0.16 | 0.17 |
| $d_b$ | 0.59 | 0.53 | 0.51 | 0.51 | 0.61 | 0.84 |
| CTE 25° C. to 800° C. ($\times 10^{-7}/°$ C.) | 9.10 | 8.50 | 9.10 | 7.00 | 12.10 | 11.70 |
| E (GPa) | 1.49 | — | 133 | 1.64 | — | — |
| $E_w$ (GPa) | 4.68 | — | 421 | 5.13 | 3.02 | — |
| $E_{w,NMC}$ (GPa) | 6.82 | — | 6.30 | 8.49 | 4.22 | — |
| $Nb^3$ | 0.26 | — | 0.28 | 0.37 | 0.22 | — |
| I-Ratios | | | | | | |
| Axial | 0.48 | 0.47 | 0.45 | 0.43 | 0.56 | 0.59 |
| Powder | 0.67 | 0.67 | 0.68 | 0.66 | 0.66 | 0.66 |
| Transverse | 0.84 | 0.85 | 0.87 | 0.86 | 0.80 | 0.80 |
| Phases by Rietveld | | | | | | |
| Cordierite | 66.7 | 69.5 | 66.8 | 62.3 | 64.5 | 64.8 |
| Indialite | 21.7 | 21.2 | 22.2 | 26.8 | 23.7 | 22.5 |
| Cordierite + Indialite | 88.4 | 90.7 | 89.0 | 89.1 | 88.2 | 87.3 |
| Spinel | | | | 3.0 | 2.5 | 2.2 |
| Mullite | 2.8 | 2.4 | 2.9 | — | — | — |
| Pseudobrookite Structured Phase | 4.9 | 4.9 | 5.0 | 4.5 | 4.5 | 4.5 |
| Rutile | 0.3 | 0.2 | 0.2 | 0.2 | 0.2 | 0.2 |
| Amorphous Phase | 2.6 | 1.7 | 2.9 | 3.2 | 4.5 | 5.8 |

TABLE 3F

Nominal oxide chemistry, processing details, properties, and phase composition of example ceramic bodies E22A-E24 after firing

| Nominal Oxide Chemistry | E22A | E22B | E22C | E22D | E23 | E24 |
|---|---|---|---|---|---|---|
| Weight Percent MgO | 12.78 | 12.78 | 12.78 | 12.78 | 12.75 | 12.70 |
| Weight Percent $Al_2O_3$ | 32.95 | 32.95 | 32.95 | 32.95 | 32.99 | 33.07 |
| Weight Percent $SiO_2$ | 48.89 | 48.89 | 48.89 | 48.89 | 48.84 | 48.73 |
| Weight Percent $TiO_2$ | 5.38 | 5.38 | 5.38 | 5.38 | 5.42 | 5.50 |
| Processing and Attributes | | | | | | |
| Soak Temperature (° C.) | 1360 | 1370 | 1380 | 1390 | 1380 | 1380 |
| Soak Time (hr) | 12 | 12 | 12 | 12 | 12 | 12 |
| Avg. Porosity (%) | 69.57 | 68.40 | 67.61 | 65.76 | 65.49 | 62.39 |
| $d_{10}$ (μm) | 8.09 | 10.72 | 11.24 | 12.06 | 11.16 | 11.54 |
| $d_{50}$ | 11.87 | 13.53 | 14.03 | 14.72 | 13.88 | 13.96 |
| $d_{90}$ | 16.01 | 17.79 | 1932. | 19.64 | 19.58 | 19.49 |
| $d_f$ | 0.32 | 0.21 | 0.20 | 0.18 | 0.20 | 0.17 |
| $d_b$ | 0.67 | 0.52 | 0.58 | 0.51 | 0.61 | 0.57 |
| CTE 25° C. to 800° C. ($\times 10^{-7}/°$ C.) | 8.40 | 9.40 | 9.30 | 9.20 | 11.00 | 10.50 |
| E (GPa) | — | — | — | — | 2.21 | 2.44 |
| $E_w$ (GPa) | — | — | — | — | 6.66 | 7.76 |
| $E_{w,NMC}$ (GPa) | — | — | — | — | 9.49 | 11.27 |
| $Nb^3$ | — | — | — | — | 0.24 | 0.25 |
| I-Ratios | | | | | | |
| Axial | — | — | — | — | 0.51 | 0.51 |
| Powder | — | — | — | — | 0.67 | 0.68 |
| Transverse | — | — | — | — | 0.85 | 0.83 |
| Phases by Rietveld | | | | | | |
| Cordierite | — | — | — | — | 59.9 | 54.4 |
| Indialite | — | — | — | — | 29.4 | 33.5 |
| Cordierite + Indialite | — | — | — | — | 89.3 | 87.9 |
| Mullite | — | — | — | — | 2.7 | 3.0 |
| Pseudobrookite Structured Phase | — | — | — | — | 7.1 | 7.2 |
| Rutile | — | — | — | — | 0.1 | 0.2 |
| Amorphous Phase | — | — | — | — | 0.7 | 1.7 |

TABLE 3G

Nominal oxide chemistry, processing details, properties, and phase composition of example ceramic bodies E25-E28 after firing

| Nominal Oxide Chemistry | E25 | E26 | E27 | E28 |
|---|---|---|---|---|
| Weight Percent MgO | 12.76 | 12.96 | 12.92 | 12.92 |
| Weight Percent $Al_2O_3$ | 33.04 | 28.76 | 33.33 | 33.33 |
| Weight Percent $SiO_2$ | 49.00 | 47.55 | 49.44 | 49.44 |
| Weight Percent $TiO_2$ | 5.21 | 10.73 | 4.31 | 4.31 |
| Processing and Attributes | | | | |
| Soak Temperature (° C.) | 1390 | 1372 | 1390 | 1395 |
| Soak Time (hr) | 12 | 12 | 12 | 12 |
| Avg. Porosity (%) | 50.79 | 66.16 | 68.02 | 64.07 |
| $d_{10}$ (μm) | 5.60 | 11.04 | 12.01 | 10.52 |
| $d_{50}$ | 7,83 | 13.48 | 15.09 | 13.57 |
| $d_{90}$ | 10.27 | 19.19 | 27.38 | 22.18 |
| $d_f$ | 0.28 | 0.18 | 0.20 | 0.22 |
| $d_b$ | 0.60 | 0.60 | 1.02 | 0.86 |
| CTE to 800° C. ($\times 10^{-7}/°$ C.) | 8.60 | 12.60 | 8.40 | 3.40 |
| E (GPa) | 4.43 | | 1.48 | — |
| $E_w$ (GPa) | — | — | — | — |
| $E_{w,NMC}$ (GPa) | — | — | — | — |
| $Nb^3$ | — | — | — | — |
| I-Ratios | | | | |
| Axial | 0.47 | | 0.47 | 0.43 |
| Powder | 0.66 | | 0.66 | 0.66 |
| Transverse | 0.88 | | 0.87 | 0.89 |
| Phases by Rietveld | | | | |
| Cordierite | 54.8 | — | 64.0 | 62.9 |
| Indialite | 32.8 | — | 25.1 | 25.2 |
| Cordierite + Indialite | 87.6 | — | 89.1 | 88.1 |
| Mullite | 2.4 | — | 2.4 | 2.8 |

TABLE 3G-continued

Nominal oxide chemistry, processing details, properties, and phase composition of example ceramic bodies E25-E28 after firing

| Nominal Oxide Chemistry | E25 | E26 | E27 | E28 |
|---|---|---|---|---|
| Pseudobrookite Structured Phase | 6.4 | — | 5.1 | 5.1 |
| Rutile | 0.4 | — | 0.2 | 0.2 |
| Amorphous Phase | 3.1 | — | 3.2 | 3.7 |

Pore size distributions of the ceramic body 100 were explored by mercury intrusion porosimetry using an Autopore® IV 9520 porosimeter. In the measurement system, pressure is increased so that mercury penetrates narrower pore channels and fills an increasing volume of the porosity until a critical pressure is reached where the mercury spans the specimen.

Thermal expansion was measured for bar-shaped samples with dimensions of approximately 0.25"×0.25"×2" (0.64× 0.64×5.1 cm) during heating from room temperature to 1,000° C. at a rate of 4° C./min and subsequent cooling to room temperature (RT). For the data reported, the long axis of the test bar was oriented in the direction of the honeycomb channels 104, thus providing the thermal expansion in the axial direction of the honeycomb body 100. Average thermal expansion coefficient from room temperature (RT) to 800° C. is defined as L(800° C.)-L(25° C.)/775° C.

Bar-shaped samples with dimension 5"×1"×0.5" (12.7× 2.54×1.27 cm) and the long axis being oriented in the direction of the honeycomb channels 104 were used to measure the elastic modulus (E) by flexural resonance frequency. Samples were heated to 1200° C. and coded back to room temperature. For each temperature the elastic modulus was directly derived from the resonance frequency and normalized for sample geometry and weight by referring to ASTM C 1198-01.

FIGS. 4A-4C illustrate scanning electron microscope (SEM) micrographs of polished fired ware of Examples E9, E7C, and E18 demonstrating magnification of the phase distributions with the cordierite and indialite phases shown as darker grey, the porosity as black, and the pseudobrookite structured phase as lighter grey. The phases present in the ceramic bodies 100 were identified by X-ray diffraction (XRD), A Phillips X'Pert diffraction system equipped with a X'Celerator high speed detector was utilized. High resolution spectra were typically acquired from 15° to 100° (2θ). Rietveld refinement was used for quantification of the phase percentages.

Figure 5:
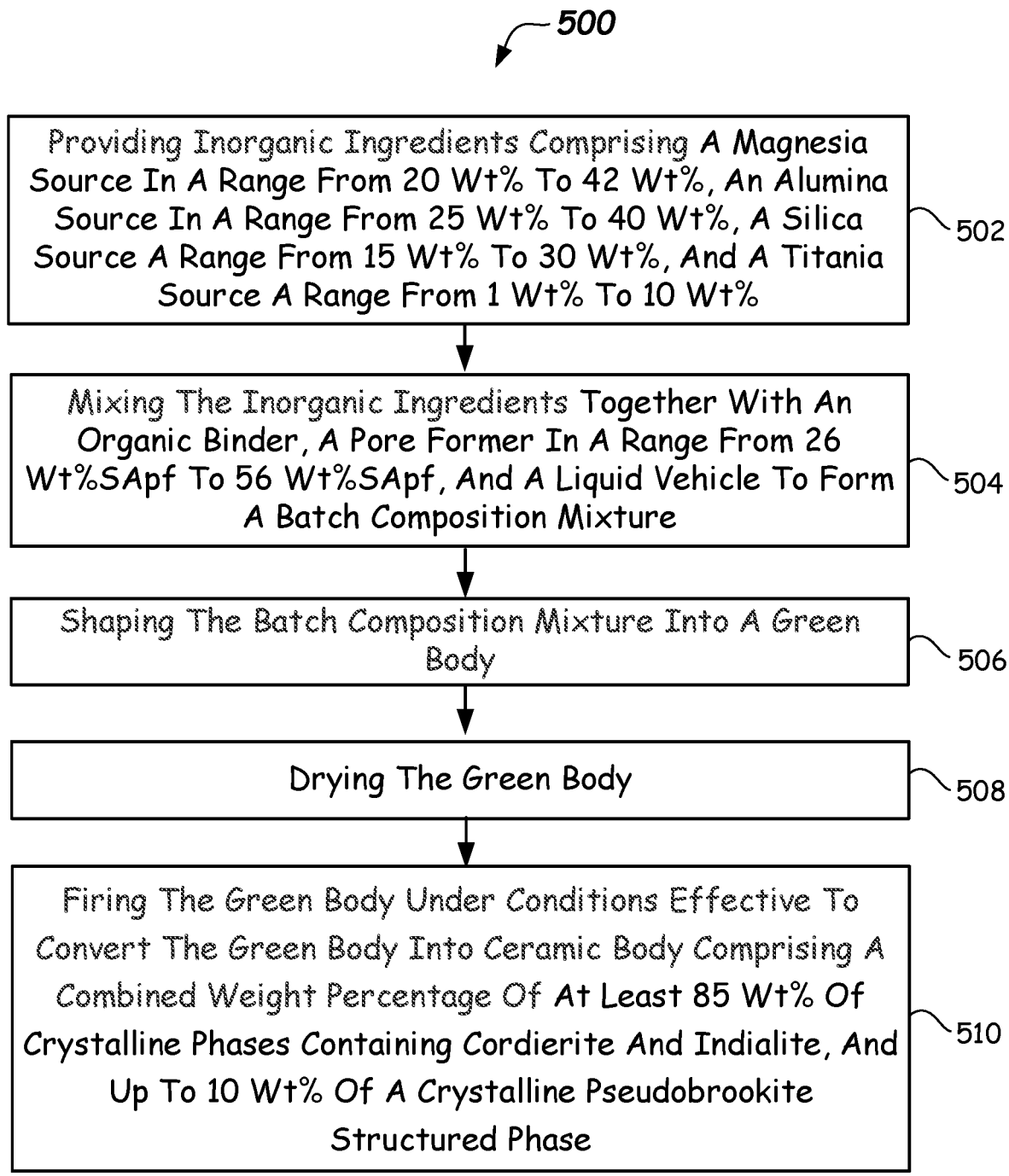
FIG. 5 illustrates a method of manufacturing a ceramic body comprising a cordierite, indialite, and pseudobrookite crystalline structured ceramic according to embodiments of the disclosure.

FIG. 5 illustrates a method of manufacturing a ceramic body 100. The method 500 comprises, in 502, providing inorganic ingredients comprising a magnesia source in a range from 20 wt % to 42 wt %, an alumina source in a range from 25 wt % to 40 wt %, a silica source a range from 15 wt % to 30 wt %, and a titania source a range from 1 wt % to 10 wt %, wherein the wt % of each of the magnesia source, alumina source, silica source, and titania source are all based on 100% of a total weight of inorganics present.

The manufacturing method 500 further comprises, in 504, mixing the inorganic ingredients together with an organic binder, a pore former in a range from 26 wt % $SA_{pf}$ to 56 wt % $SA_{pf}$, and a liquid vehicle to form a batch composition mixture, wherein wt % $SA_{pf}$ is weight percent by superaddition based on 100% of the total weight of the inorganics.

The manufacturing method 500 further comprises, in 506, shaping the batch composition mixture into a green body (e.g., green body 100G), and, in 508, drying the green body 100G, as is described herein. Shaping the batch composition mixture 210 into the green body 100G can comprise extrusion of the batch composition mixture 210 through an extrusion die 218 to form the green honeycomb body. Optionally, shaping may be by any other suitable method.

The manufacturing method 500 further comprises, in 510, firing the green body under conditions effective to convert the green body into ceramic body (e.g., ceramic body 100) comprising a combined weight percentage of at least 85 wt % of crystalline phases containing cordierite and indialite, and up to 10 wt % of a crystalline pseudobrookite structured phase. The crystalline phase comprising the pseudobrookite structured phase can comprise armalcolite in some embodiments. However, other pseudobrookite structured phases can be provided. In some embodiments, the firing conditions effective to convert the green body (e.g., green body 100G) into a ceramic body 100 comprise heating the green body 100 at a soak temperature in the range of 1350° C. to 1410° C. and maintaining the hold temperature for a soak time sufficient to convert the green body 100G into the ceramic body 100.

It will be apparent to those skilled in the art that various modifications and variations can be made to the various embodiments disclosed herein without departing from the scope of the disclosure. Thus, it is intended that the present disclosure cover the modifications and variations of the embodiments disclosed provided they come within the scope of the claims and their equivalents.

What is claimed is:

1. A ceramic body, comprising:
   % P≥50%, wherein % P is average bulk porosity by volume;
   df≤0.36, wherein df is $(d_{50}-d_{10})/d_{50}$;
   a combined weight percentage of crystalline phases containing cordierite and indialite of at least 85 wt %;
   up to 10 wt % of a crystalline phase comprising a pseudobrookite structure,
   wherein the ceramic body contains, as expressed in weight percent on an oxide basis, either:
   1% wt % to 11% wt % titania and 89% wt % to 99% wt % MgO, $Al_2O_3$, and $SiO_2$ that have relative weight ratios of $MgO:Al_2O_3:SiO_2$ within the field defined by 15.6:34.0:50.4, 12.6:34.0:53.4, 13.9:30.7: 55.4, and 16.9:30.7:52.4, or
   2.5% to 11% titania and 89% wt % to 97.5% wt % MgO, $Al_2O_3$, and SiO2 that have relative weight ratios of $MgO:Al_2O_3:SiO_2$ within the field defined by 15.6:34.0:50.4, 12.6:34.0:53.4, 12.0:35.7:52.3, and 15.0:35.7:49.3.

2. The ceramic body of claim 1, comprising 50%≤% P≤72%.

3. The ceramic body of claim 1, comprising 65%≤% P≤72%.

4. The ceramic body of claim 1, comprising df≤0.22.

5. The ceramic body of claim 1, comprising 0.16≤df≤0.20.

6. The ceramic body of claim 1, comprising 7 μm≤$d_{50}$≤20 μm, wherein $d_{50}$ is a median pore size of the ceramic article.

7. The ceramic body of claim 6, comprising 10 μm≤$d_{50}$≤20 μm, wherein $d_{50}$ is a median pore size of the ceramic article.

8. The ceramic body of claim 6, comprising 12 μm≤$d_{50}$≤20 μm, wherein $d_{50}$ is a median pore size of the ceramic article.

9. The ceramic body of claim 1, comprising CTE≤14×$10^{-7}$/° C., wherein CTE is a coefficient of thermal expansion, as measured between 25° C.-800° C.

10. The ceramic body of claim 1, comprising:
50%≤% P≤72%;
7 μm≤$d_{50}$≤20 μm, wherein $d_{50}$ is a median pore size;
0.16≤df≤0.36; and
3×$10^{-7}$/K≤CTE≤14×$10^{-7}$/K.

11. The ceramic body of claim 1, comprising:
60%≥% P≥72%;
10 μm≤$d_{50}$≤20 μm, wherein $d_{50}$ is a median pore size;
0.16≤df≤0.25; and
3×$10^{-7}$/° C.≤CTE≤13×$10^{-7}$° C., wherein CTE is a coefficient of thermal expansion of the ceramic body as measured between 25° C. and 800° C.

12. The ceramic body of claim 1, comprising:
60%≤% P≤72%;
12 μm≤$d_{50}$≤20 μm, wherein $d_{50}$ is a median pore size of the ceramic body;
0.16≤df≤0.20; and
3×$10^{-7}$/K≤CTE≤12×$10^{-7}$/K, wherein CTE is a coefficient of thermal expansion of the ceramic body as measured between 25° C. and 800° C.

13. The ceramic body of claim 1, comprising:
60%≤% P≤72%;
13 μm≤$d_{50}$≤20 μm, wherein $d_{50}$ is a median pore size of the ceramic body;
0.16≤df≤0.18; and
3×$10^{-7}$/K≤CTE≤12×$10^{-7}$/K, wherein CTE is a coefficient of thermal expansion of the ceramic body as measured between 25° C. and 800° C.

14. The ceramic body of claim 1, wherein the combined weight percentage of the crystalline phases of cordierite and indialite range from 85 wt % to 92 wt %.

15. The ceramic body of claim 1, wherein the pseudobrookite structure comprises a crystalline phase of armalcolite.

16. The ceramic body of claim 15, wherein the crystalline phase of armalcolite ranges from 2 wt % to 8 wt %.

17. The ceramic body of claim 1, comprising an amorphous phase of less than 7 wt %.

18. The ceramic body of claim 1, comprising 2% wt % to 6 wt % titania and 94% wt % to 98% wt % MgO, $Al_2O_3$, and $SiO_2$ that have relative weight ratios of MgO:Al2O3:SiO2 within the field defined by 14.3:34.9:50.8; 13.3:34.9:51.8; 14.3:32.3:53.4; and 15.3:32.3:52.4.

19. A ceramic body, comprising:
crystalline phases comprising cordierite and indialite with a combined weight percentage ranging between 85 wt % to 92 wt %, and a second crystalline phase of up to 10 wt % of a pseudobrookite structure comprising armalcolite,
wherein the ceramic body contains, as expressed in weight percent on an oxide basis, 1% wt % to 11% wt % titania, and 89% wt % to 99% wt % MgO, $Al_2O_3$, and $SiO_2$ that have relative weight ratios of MgO:$Al_2O_3$:$SiO_2$ within the field defined by 15.6:34.0:50.4, 12.6:34.0:53.4, 13.9:30.7:55.4, and 16.9:30.7:52.4;
55%≤% P≤72%;
8 μm≤$d_{50}$≤20 μm, wherein $d_{50}$ is a median pore size;
0.16≤df≤0.32, wherein df is $(d_{50}-d_{10})/d_{50}$; and
3×$10^{-7}$/° C.≤CTE≤14×$10^{-7}$/° C. from 25° C. to 800° C.

20. A ceramic body, comprising:
crystalline phases comprising cordierite and indialite with a combined weight percentage ranging between 85 wt % to 92 wt %, and a second crystalline phase of up to 10 wt % pseudobrookite structure comprising armalcolite, wherein the ceramic body contains, as expressed in weight percent on an oxide basis, 2.5% to 11% titania and 89% wt % to 97.5% wt % MgO, $Al_2O_3$, and $SiO_2$ that have relative weight ratios of MgO:$Al_2O_3$:$SiO_2$ within the field defined by 15.6:34.0:50.4, 12.6:34.0:53.4, 12.0:35.7:52.3, and 15.0:35.7:49.3;
55%≤% P≤72%;
8 μm≤$d_{50}$≤20 μm, wherein $d_{50}$ is a median pore size;
0.16≤df≤0.32, wherein df is $(d_{50}-d_{10})/d_{50}$; and
3×$10^{-7}$/° C.≤CTE≤14×$10^{-7}$/° C. from 25° C. to 800° C.

* * * * *

UNITED STATES PATENT AND TRADEMARK OFFICE
CERTIFICATE OF CORRECTION

PATENT NO. : 11,891,339 B2
APPLICATION NO. : 17/271988
DATED : February 6, 2024
INVENTOR(S) : Huthavahana Kuchibhotla Sarma et al.

It is certified that error appears in the above-identified patent and that said Letters Patent is hereby corrected as shown below:

In the Claims

In Column 27, Line 13, in Claim 11, delete "$10^{-7°}$ C.," and insert -- $10^{-7}/°$ C., --.

Signed and Sealed this
Thirtieth Day of September, 2025

John A. Squires
*Director of the United States Patent and Trademark Office*